US006658207B1

(12) United States Patent
Partynski et al.

(10) Patent No.: US 6,658,207 B1
(45) Date of Patent: *Dec. 2, 2003

(54) METHOD OF FRAMING RECONNAISSANCE WITH MOTION ROLL COMPENSATION

(75) Inventors: Andrew J. Partynski, Crystal Lake, IL (US); Stephen R. Beran, Mt. Prospect, IL (US)

(73) Assignee: Recon/Optical, Inc., Barrington, IL (US)

( * ) Notice: Subject to any disclaimer, the term of this patent is extended or adjusted under 35 U.S.C. 154(b) by 548 days.

This patent is subject to a terminal disclaimer.

(21) Appl. No.: 09/654,031

(22) Filed: Aug. 31, 2000

(51) Int. Cl.⁷ .................... G03B 39/00; H04N 7/18; H04N 9/47
(52) U.S. Cl. ................. 396/7; 396/8; 396/12; 396/13; 348/144; 348/145; 348/146; 348/147
(58) Field of Search ............... 396/7, 8, 12, 13; 348/146, 147, 144, 145

(56) References Cited

U.S. PATENT DOCUMENTS

| | | | |
|---|---|---|---|
| 4,714,307 A | 12/1987 | Palmer | 350/1.3 |
| 5,155,597 A | 10/1992 | Lareau et al. | 358/213.24 |
| 5,668,593 A | 9/1997 | Lareau et al. | 348/146 |
| 5,692,062 A | 11/1997 | Lareau et al. | 382/107 |
| 5,798,786 A | 8/1998 | Lareau et al. | 348/144 |
| 5,806,789 A | 9/1998 | Boulware et al. | 244/1 |
| 5,841,574 A | 11/1998 | Willey | 359/351 |
| 5,925,883 A | 7/1999 | Woolaway, II | 250/370.08 |
| 6,370,329 B1 * | 4/2002 | Teuchert | 396/7 |
| 2003/0059214 A1 * | 3/2003 | Partynski et al. | 396/7 |

OTHER PUBLICATIONS

Integration of the KS–147A LOROP into RF—5E, Robert L. Walke, F–5 Airborne Equipment Design, Jeffrey P. Duda, EO and Recce Systems, Northrop Corporation, SPIE vol. 561, *Airborne Reconnaissance 1X*, pp. 26–33, Aug. 1985.

The KS–1476A LOROP Camera Sytem, Obert Ostrem and John G. Hughes, Recon/Optical, Inc., SPIE vol. 561, *Airborne Reconnaissance 1X*, pp. 18–25, Aug. 1985.

Image Stabilization Techniques for Long Range Reconnaissance Camera, George R. Lewis, Recon/Optical, Inc., pp. 1–6, Jul. 1980.

The KS–146A LOROP Camera System, Thomas Augustyn, Recon/Optical, Inc., SPIE Proceedings, vol. 309, paper # 309–11, p. 26, Aug. 27–28, 1981.

(List continued on next page.)

Primary Examiner—Russell Adams
Assistant Examiner—Melissa J. Koval
(74) Attorney, Agent, or Firm—McDonnell Boehnen Hulbert & Berghoff

(57) ABSTRACT

An electro-optical roll-framing camera is described in which successive overlapping frames of scene imagery are generated by an electro-optical imaging array. Image motion compensation is performed electronically to stop or freeze image motion caused by the roll motion. The image motion compensation is performed by the array during the generation of the frames of imagery. The successive frames of imagery are made during a continuous roll motion of the entire camera (including the array). The image motion due to roll is stopped or frozen without mechanically stopping the roll motion, such as found in prior art step frame cameras. The roll framing cycles of the camera generate sweeping coverage of the terrain of interest. The roll rate for a given electro-optical array is a function of the frame size and the framing rate, and is controllable by a master camera control computer.

51 Claims, 26 Drawing Sheets

OTHER PUBLICATIONS

Sementelli, R.G., "EO/IR dual band reconnaissance system DB–110", *SPIE—The International Society for Optical Engineering, Airborne Reconnaissance XIX*, vol. 2555–30, P. 222–228, Jul. 11–12, 1995.

Lane, R.N., Delaney, J.K., "DB–110 Performance Update", *SPIE—The International Society for Optical Engineering,* *Airborne Reconnaissance XIX*, vol. 2555–30, p. 246–254, Jul. 11–12, 1995.

Riehl, K., Maver, L.A., Sementelli, R.G., "The Raytheon DB–110–Sensor; Four Cameras in One Package", National Military Sensing Symposium, Nov. 1999.

* cited by examiner

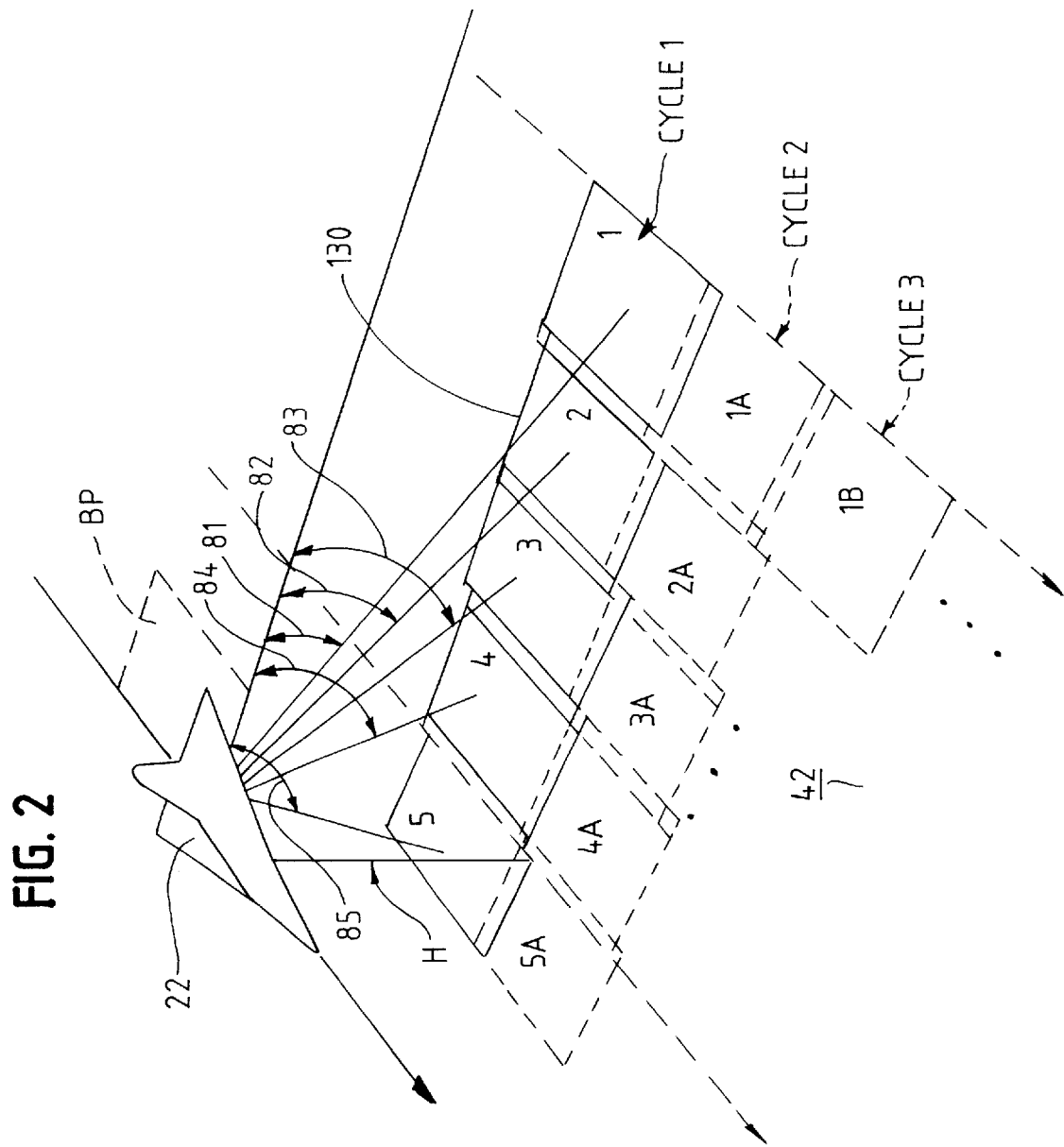

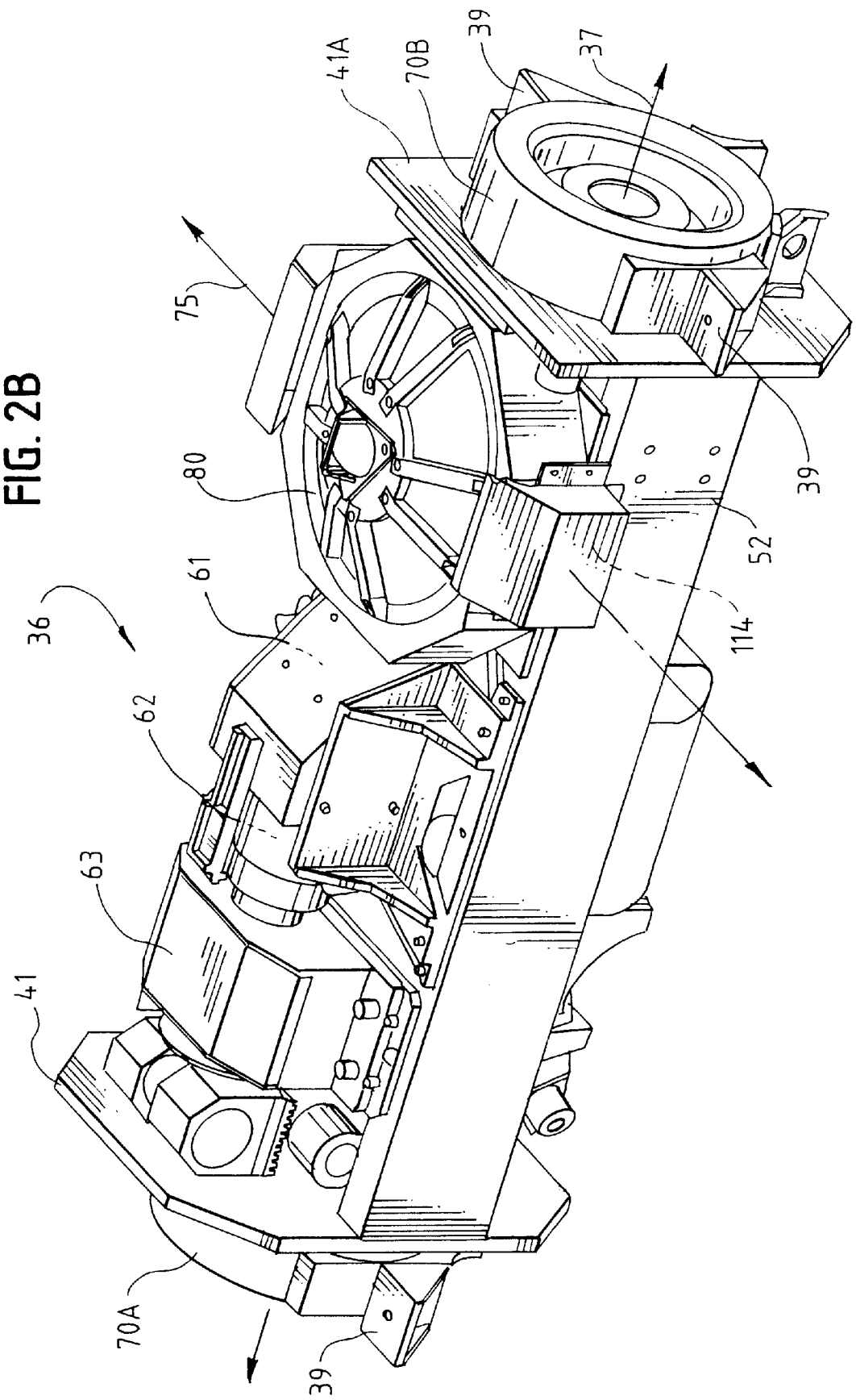

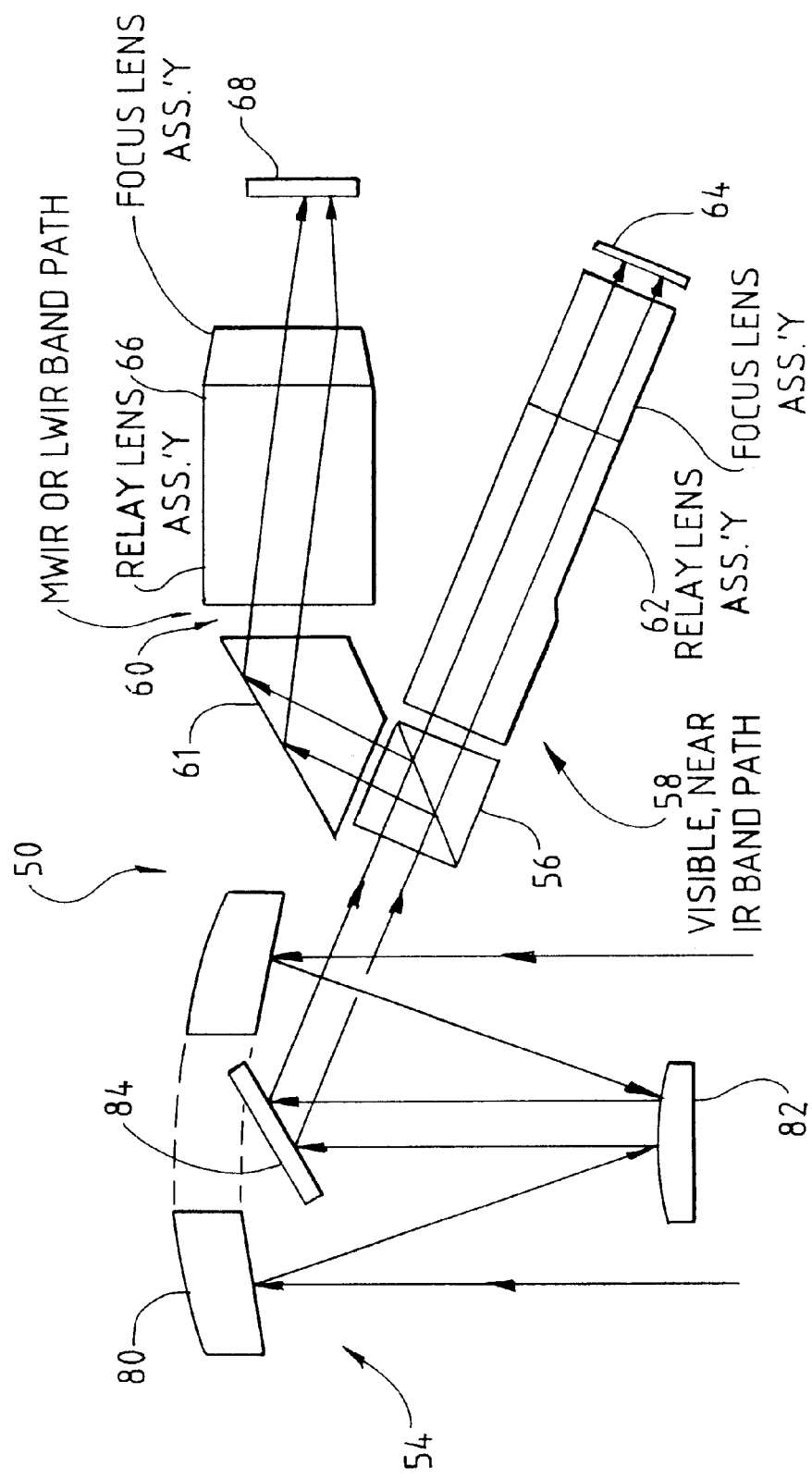

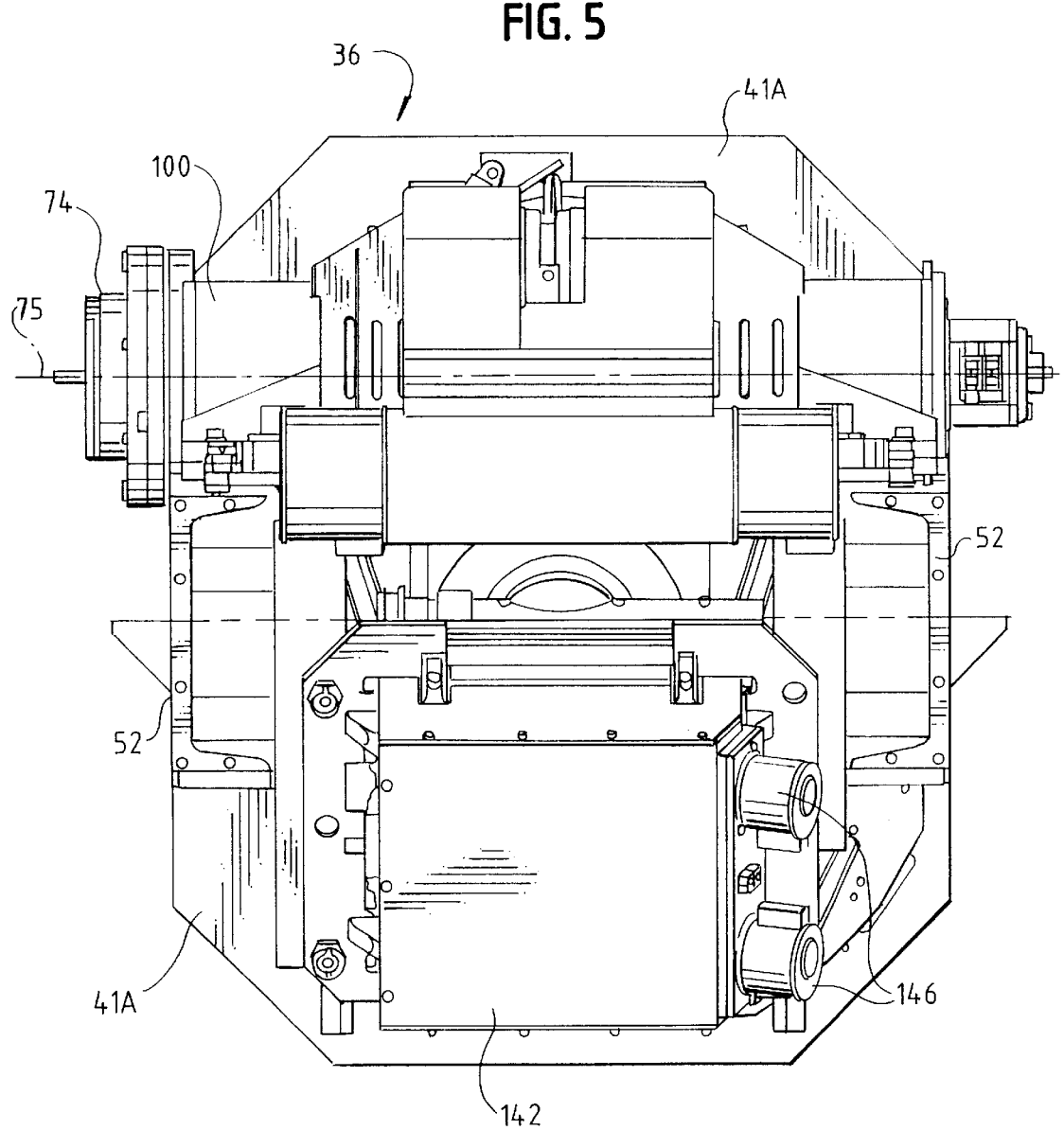

MODIFIED 50", F/4 VISIBLE PATH

MODIFIED 50", F/4 MWIR PATH

METHOD OF FRAMING RECONNAISSANCE WITH MOTION ROLL COMPENSATION

CROSS-REFERENCE TO RELATED APPLICATIONS

This application is related to the following patent applications filed on the same date as this application, the contents of each of which is incorporated by reference herein:

Andrew J. Partynski et al., DUAL BAND FRAMING RECONNAISSANCE CAMERA, Ser. No. 09/652,524, now U.S. Pat. 6,477,326;

Stephen R. Beran et al., METHOD OF FORWARD MOTION COMPENSATION IN AN AERIAL RECONNAISSANCE CAMERA, Ser. No. 09/652,965, now U.S. Pat. No. 6,366,734;

Stephen R. Beran et al., CASSEGRAIN OPTICAL SYSTEM FOR FRAMING AERIAL RECONNAISSANCE CAMERA, Ser. No. 09/652,529, now U.S. Pat. No. 6,374,047.

BACKGROUND OF THE INVENTION

A. Field of the Invention

This invention relates generally to the field of aerial reconnaissance, remote sensing, mapping and surveillance camera systems. Generally speaking, aerial reconnaissance cameras are available in framing and pan scanning configurations, in both film and electro-optical implementations. The present invention relates to both types of camera configurations, in that a roll framing camera such as described herein generates individual frames of imagery, while the smooth rolling operation provides similar scene coverage and inertial load reductions found in pan scanning cameras.

B. Description of Related Art

In prior art framing cameras, an exposure is taken over a large scene of fixed format. The field of view of the camera is stepped across a large area using mechanically driven stepping hardware while using image motion compensation techniques to compensate for forward motion of the aircraft. The field of view of the camera is a function of lens focal length and the geometrical format size of the image recording media. The exposure time is generally controlled by a shutter and is a function of 1) the sensitivity of the photosensitive media, 2) lens transmittance and relative aperture, and 3) available scene brightness. The photosensitive material can be film, an area array Charge Coupled Device (CCD), or any other media which records an image for later retrieval.

Forward Motion Compensation (FMC) is a technique used in framing cameras to correct for the image motion on the recording media caused by forward motion of the aircraft during the exposure interval. This correction is generally introduced by moving the film or the lens to keep the image stationary in the fore/aft direction while the exposure is taking place. In a framing camera, the correction is usually accomplished by moving the film to match the rate of image motion. U.S. Pat. No. 5,668,593 to Lareau et al., assigned to the assignee of the present invention, the contents of which hare incorporated by reference herein, describes a electro-optical step frame camera system in which the forward motion compensation is achieved electronically in the focal plane of the electro-optical detector.

One limitation of a conventional film or CCD framing camera is that only a single FMC rate can be applied to any given frame regardless of the field of view. Consequently, the motion can exactly be corrected for only a portion of the image. When exposure times are short and the field angles small, this is acceptable. However, for larger fields of view and where longer exposure times are required (as at dusk or under other low light level conditions), the differential rate of motion between the film and the image increases with the field angle and can be large enough result in image blur at the edges of the field. A major advance in forward motion compensation in electro-optical framing cameras is disclosed in the Lareau et al. patent, U.S. Pat. No. 5,155,597, assigned to the assignee of the present invention. The Lareau et al. '597 patent, which is incorporated by reference herein, describes an electro-optical imaging array that accomplishes FMC electronically and without moving parts by dividing the columns of the array into multiple column groups, and by transferring pixel information in the column groups at a rate that substantially matches the rates of image motion in the column groups.

Another operational function of a framing camera is the generation of an overlap between successive frames of imagery. The overlap is used to ensure complete coverage of all areas of the scene, and/or to provide a view of the scene from two different angular perspectives yielding stereo imagery. In a conventional framing camera, the amount of overlap is selectable and nearly always takes place in the direction of flight.

In step frame cameras, the overlap L(OL) of the two frames of imagery is typically of 10% or 12%, or as much as 56%. An overlap of at least 50% allows all imagery in the adjacent frames to be exposed from two different angular perspectives. These images can be recombined by means of a stereo viewing system to achieve depth perception. Such stereo images are often used by a photointerpreter to gather additional information about the scene.

The operation of a film-type framing camera in a stepping mode is known in the art. For example, the article entitled "The KS-146A LOROP Camera System", Thomas C. Augustyn, SPIE Proceedings Vol.9, Aug. 27–28 1981, paper 309–11 p.76, describes an automatic stepping mode in which the camera cycle rate is proportional to aircraft velocity, altitude and selected depression angle, to achieve 56% overlap for stereo viewing or 12% overlap for maximum flight line coverage. With the camera line of sight normal to the flight path, the scan head provides either 1, 2, 4, or 6 lateral-step cycles. A similar stepping operation for a frame camera is described in the article entitled "KS-127A Long Range Oblique Reconnaissance Camera for RF-4 Aircraft", Richard C. Ruck and Oliver J. Smith, SPIE Proceedings Vol. 242, Jul. 29–30, 1980 San Diego Paper 242-02, p.22.

Panoramic (pan) camera technology is another well-established means of imaging. In a panoramic scanning camera, the scene is exposed continuously by rotating a scanning mechanism (such as a double dove prism) so as to scan the image across the photosensitive medium. The photosensitive medium is moved in synchronism with the image. In the case of a film camera, this may be accomplished by moving the film at a constant rate past an exposure slit which is located on the lens optical axis. A scan prism located in front of the lens is rotated in synchronism with the film rate such that the image of the scene remains stationary on the film during the exposure period. The slit opening is adjusted to a predetermined width to control exposure time.

One major advantage of a pan camera is its ability to image a large area in the direction across the line of flight.

Scan angles across the line of flight on the order of 120 to over 180 degrees are typical. The lens field of view in a pan camera is generally only required to be large enough to cover the width of the film. Overlapping of images and stereo imagery may also be obtained with pan cameras. Image overlap in a conventional fixed mounted pan camera is obtained as in the case of a framing camera, that is, in the common area between successive scans.

FMC for both the film and electro-optical versions of the pan camera is usually accomplished by a conventional electromechanical means. Translating the lens during the scan is a popular means to achieve graded FMC as a function of instantaneous slant range to the scene. As noted above, the FMC can be done electronically as taught in the Lareau et al. U.S. Pat. No. 5,668,593.

Prior art mechanically stepped framing panoramic cameras, such as described in the '593 patent and in the KS-146A camera are limited in size and the stepping rate by the mass and commensurate inertial loading created by trying to step that mass across the area of interest. Since the size and mass of the camera increases with operation in multiple spectral bands (i.e., with two or more detectors incorporated into the camera), the capability of mechanically stepped cameras is limited to smaller and more limited camera configurations.

Thus, there exists a need in the art for an electro-optical camera which obtains broad area coverage in the manner of a panning or step framing camera without the above limitations. The present invention meets that need by providing a novel roll framing technique for generating broad area coverage with an area array image recording medium, described in more detail herein. The image motion due to camera roll is compensated for electronically in the detector array. The invention is also particularly suitable for larger, more massive, and more complex cameras, including a camera which carries two or more imaging detectors in order to generate frames of imagery in two or more different bands of the electromagnetic spectrum simultaneously.

SUMMARY OF THE INVENTION

The present invention provides the capability for collection of imagery using a framing camera in which a continuous scan motion about the roll axis of the aerial reconnaissance vehicle is performed, a technique referred to herein as "roll framing". As the camera rototes about the roll axis in a continuous fashion, the roll motion is compensated for electronically. This enables high resolution imagery to be generated without loss of resolution or blur, due to the fact that relative motion of the image with respect to the image recording media caused by the roll motion is compensated for using the techniques described herein.

The continuous roll motion of the camera facilitates image collection without large inertial accelerations and decelerations or large power spikes, as are found in prior art step frame camera system when the camera mass is physically stepped across the terrain of interest in a series of start and stop movements. The present invention is believed superior to prior art step framing cameras since the problems inherent with mechanical stepping are eliminated. The camera and method are applicable to all sizes and arrangements of cameras, including cameras implementing single spectrum, multi-spectrum and hyperspectral optical systems. The invention is also applicable to cameras with mechanical shutters, electronic shutters, acoustical/optical switches, and other electronic exposure controls.

Thus, in a first aspect of the invention, a method is provided for imaging a scene with a framing camera installed in an aerial reconnaissance vehicle. The camera comprises a two dimensional array of photosensitive cells, an optical system directing scene radiation onto said array, and a mechanism for rolling the camera about a rotation axis. The array of cells store pixel information and is arranged in a plurality of rows and columns. The method comprises the steps of:

(a) continuously rotating the camera about the rotation axis with the roll mechanism to thereby direct scene information onto the two dimensional array;

(b) exposing the array while the camera is rotating and transferring pixel information in the array at a rate substantially equal to an image motion rate due to the rotation of the camera;

(c) reading out the pixel information from the array; and (d) repeating said steps (b), and (c) while the vehicle flies past a scene of interest and while the camera continuously rotates about the roll axis, thus generating a series of frames of imagery.

In a preferred embodiment, the camera is mounted to the aerial reconnaissance vehicle such that the step of continuously rotating comprises the step of rotating said camera about an axis substantially parallel to the direction of forward motion of the reconnaissance vehicle. However, the camera could also be mounted in an orthogonal configuration such that the step of continuously rotating comprises the step of rotating the camera about an axis in a direction substantially orthogonal to the direction of forward motion of said aerial reconnaissance vehicle. In this less preferred embodiment, the camera could roll essentially about the pitch axis and generate a series of images in the forward oblique direction towards nadir.

In a typical embodiment, the steps (a), (b), (c), and (d) recited above are performed in a a series of cycles as the aircraft flies past a scene of interest. The frames overlap one another so as to avoid gaps in scene coverage. If the overlap is sufficient, it would be possible to obtain stereo imagery of the scene of interest. The camera can be configured with just a single detector and generate imagery in a single band of the electro-magnetic spectrum. Alternatively, the camera includes a second electro-optical detector and the camera generates imagery in two bands of the electromagnetic spectrum simultaneously from the first and second detectors. The preferred embodiment described in detail herein is an example of a dual band imaging system. As yet another alternative embodiment, the camera includes an electro-optical detector and optical system for generating imagery in a pan-chromatic spectral band, such as a hyperspectral electro-optical imaging array.

In another aspect of the invention, an electro-optical roll framing camera with electronic roll motion compensation is provided. The camera is adapted for installation in an aerial reconnaissance vehicle. The camera comprises an electro-optical detector comprising a two-dimensional array of photosensitive cells that store pixel information. The array is arranged in a plurality of rows and columns and has at least one readout register for reading out pixel information from the array. The camera further includes an optical system directing scene radiation onto the array. A servo-mechanical system is provide which couples the camera to the aerial reconnaissance vehicle which is adapted or configured for continuously rolling the camera about a rotation axis to thereby direct scene information onto the optical system and array. Further, roll motion compensation circuitry is provided for electronically transferring pixel information in the array of photosensitive cells at a rate substantially matching the rate of image motion due to the rotation of the camera, whereby the resolution of images generated by said array may be preserved.

In the illustrated embodiment, the servo-mechanical subsystem includes a first motor system coupled to the camera housing that rotates the camera housing (including the optical system as recited above) about a first axis. The camera housing is preferably installed in the aerial reconnaissance vehicle such that this first axis of rotation is parallel to the roll axis of the aerial reconnaissance vehicle (referred to herein for simplicity as "the roll axis"). The image recording media are exposed to the scene to generate frames of imagery as the first motor system rotates the camera housing in a continuous fashion about the roll axis. The first and second image recording media have a means for compensating for image motion due to the rotation of the camera housing. In an electro-optical embodiment of the image recording media, the roll motion compensation means is preferably comprised of electronic circuitry for clocking or transferring pixel information through the electro-optical detectors at a uniform rate substantially equal to the rate of image motion due to camera rotation. A method of calculating the image motion rate, and thus pixel information transfer rate, due to roll of the camera housing is disclosed herein. If a film camera is used for the image recording media, a mechanical system is used to move the film at a rate substantially equal to the image motion rate.

In the preferred embodiment, the servo-mechanical subsystem also includes a second motor system coupled to the Cassegrain optical system. The second motor system rotates the Cassegrain optical system about a second axis in the direction of forward motion of the reconnaissance vehicle to compensate for forward motion of the aerial reconnaissance vehicle. The action of the first motor assembly to rotate the entire camera housing about the roll axis occurs at the same time (i.e., simultaneously with) the action of the second motor system to rotate the Cassegrain optical system in the line of flight to accomplish forward motion compensation. The net effect of the action of the second motor system and the roll motion compensation system is that the image of the scene of interest is essentially frozen in the focal plane while the image recording media obtain the frames of imagery, allowing high resolution images of the scene to be obtained.

In a preferred embodiment, the camera is a dual band framing camera, and there are first and second image recording media each comprising two dimensional area array electro-optical detectors. One may be manufactured from materials sensitive to radiation in the visible portion of the electromagnetic spectrum, and in a preferred embodiment is a charge-coupled device (CCD) detector of say 5,000×5,000 or 9,000×9,000 pixels. The other of the electro-optical detectors is made from a material sensitive to radiation in the infrared portion of the electromagnetic spectrum, and may be a platinum silicide array of photo diode detectors or other suitable type of electro-optical detector suitable for IR detection. The detector sensitive to radiation in the infrared portion of the electromagnetic spectrum is preferably sensitive to radiation having a wavelength of between 3.0 and 5.0 microns (MWIR), or from about 8.0 to about 14.0 microns (LWIR). In either of the embodiment of electro-optical detectors, they will typically comprise an array of pixel elements arranged in a plurality of rows and columns. The means for compensation for roll motion of the camera housing comprises electronic circuitry for transferring pixel information in the electro-optical detectors from row to adjacent row at a pixel information transfer rate (uniform across the array) substantially equal to the rate of image motion in the plane of the electro-optical detectors due to roll of the camera housing. Thus, the roll motion compensation can be performed electronically on-chip.

As a further possible embodiment, electro-optical detectors with the capability for transferring pixel information in both row and column directions independently, such as described in Lareau et al., U.S. Pat. No. 5,798,786, could be used for the image recording media. Forward motion compensation and roll motion compensation could be performed on-chip in the detectors.

The present invention required the solution to several difficult technical challenges, including optical, servo-mechanical and operational difficulties. For an electro-optical framing LOROP camera to operate in a continuous sweep with a framing array with at least two discrete bands of the electromagnetic spectrum at the same time, the challenge is to accurately compensate for the roll motion electronically at a focal plane detector with (1) good image quality and satisfactory modulation transfer function, (2) while minimizing inertial loading, and (4) enabling the use of a relatively large two-dimensional area array as a focal plane detector to get an adequate field of view and resolution. In accordance with one aspect of the invention, these optical challenges were solved by an on-chip roll motion compensation described in more detail herein.

The inventive multi-band LOROP/Tactical camera using electronic roll motion compensation does not lend itself to the use of servo-mechanical systems developed for prior art LOROP systems, particularly those used in prior art step frame cameras (such as described in the Lareau et al. '593 patent). The prior art step frame cameras use a stepping mirror to step across the line of flight and direct radiation onto the array, and require a de-rotation mechanism, such as a Pechan prism, to de-rotate the images. The standard solution of stepping the entire LOROP camera system or even a large scan mirror assembly at the operational frame rate are not acceptable alternatives for large LOROP cameras, and in particular large dual band systems. In particular, the applications of the present invention are flexible enough to include both strategic and tactical aircraft, as well as the new breed of aircraft being used by the military for reconnaissance known as unmanned aerial vehicles (including low observables). The diversity of these applications posed a power and stability problem that prevents application of prior art solutions. The task of stepping a 400 lb. camera mass two to four times a second creates tremendous inertial loads as well as power spikes that would be unacceptable. Even the inertia and associated settling times of a stepped scan head assembly pose problems in some applications.

This servo-mechanical situation required a unique inventive solution, described in detail herein. The solution, as provided in one aspect of the present invention, was to (1) rotate the entire camera (including the entire optical system and the image recording media) smoothly in a continuous fashion about an axis parallel to the aircraft roll axis, similar to the pan-type movement, but without the starts and stops used in a traditional step-frame camera system, and (2) operating the camera as a framing camera while the camera undergoes the smooth rotation. Frames of imagery are thus taken while the camera smoothly rotates about the roll axis at a constant angular velocity. In addition to this novel "roll-framing" technique, the present invention also electronically compensates for, i.e., stops, the image motion due to roll while the camera is scanning in a smooth motion. Meanwhile, a novel forward motion compensation technique is performed by the Cassegrain optical assembly to cancel out image motion effects due to the forward motion of the aircraft. The result enables exposures of the image recording media to the scene while compensating for roll and forward motion, enabling high-resolution images to be obtained.

The present invention thus solves the difficult optical, servo-mechanical and operational problems and provides a dual band framing electro-optical LOROP camera that delivers a performance and technical capability that has never before been achieved. In particular, it provides a system by which high-resolution frames of imagery in two different portions of the electromagnetic spectrum can be generated simultaneously. The inventive camera can be used in a quasi-stepping mode, in which overlapping frames of imagery are obtained across the line of flight. It can also be used in a spot mode, in which the camera is oriented in a particular direction to take an image of a target expected to be in the field of view.

Many of the teachings of the present invention are particularly applicable to a dual band electro-optical framing reconnaissance camera, and such a camera is the preferred embodiment. However, as explained below, some of the techniques and methods of the subject camera system, such as the roll-framing operation and unique roll and forward motion compensation techniques, are applicable to a camera system that images terrain in only one portion of the electromagnetic spectrum. Thus, in an alternative embodiment the camera is basically as set forth as described above, except that only a single detector is used and a spectrum-dividing prism and second optical path are not needed. Furthermore, while a preferred embodiment uses a two-dimensional electro-optical imaging array for the detector in each of the bands of the electromagnetic spectrum, the inventive camera system can be adapted to use film or other types of detectors for the photosensitive recording medium. In the film camera embodiment, roll motion compensation could be performed by moving the film in a manner such that the film velocity substantially matches the image velocity due to camera roll.

While the foregoing summary has described some of the highlights of the inventive camera system, further details on these and other features will be described in the following detailed description of a presently preferred embodiment of the invention.

BRIEF DESCRIPTION OF THE DRAWINGS

Presently preferred embodiments of the invention will be discussed below in conjunction with the appended drawing figures, wherein like reference numerals refer to like elements in the various views, and wherein:

FIG. 2 is a schematic representation of the aircraft of FIG. 1 taking a series of 5 frames of images in a series of cycles while flying past the terrain of interest;

FIGS. 2A and 2B are perspective view of the camera system of FIG. 1, shown isolated from the rest of the aircraft, and with protective covers removed in order to better illustrate the components of the camera;

FIG. 5 is an end view of the camera system of FIG. 3–4, shown from the right-hand end of the camera housing and with the roll motor and cover plate at that end removed in order to better illustrate the other structures in the camera;

DETAILED DESCRIPTION OF THE PREFERRED EMBODIMENT

Overview and Method of Operation

Figure 1:
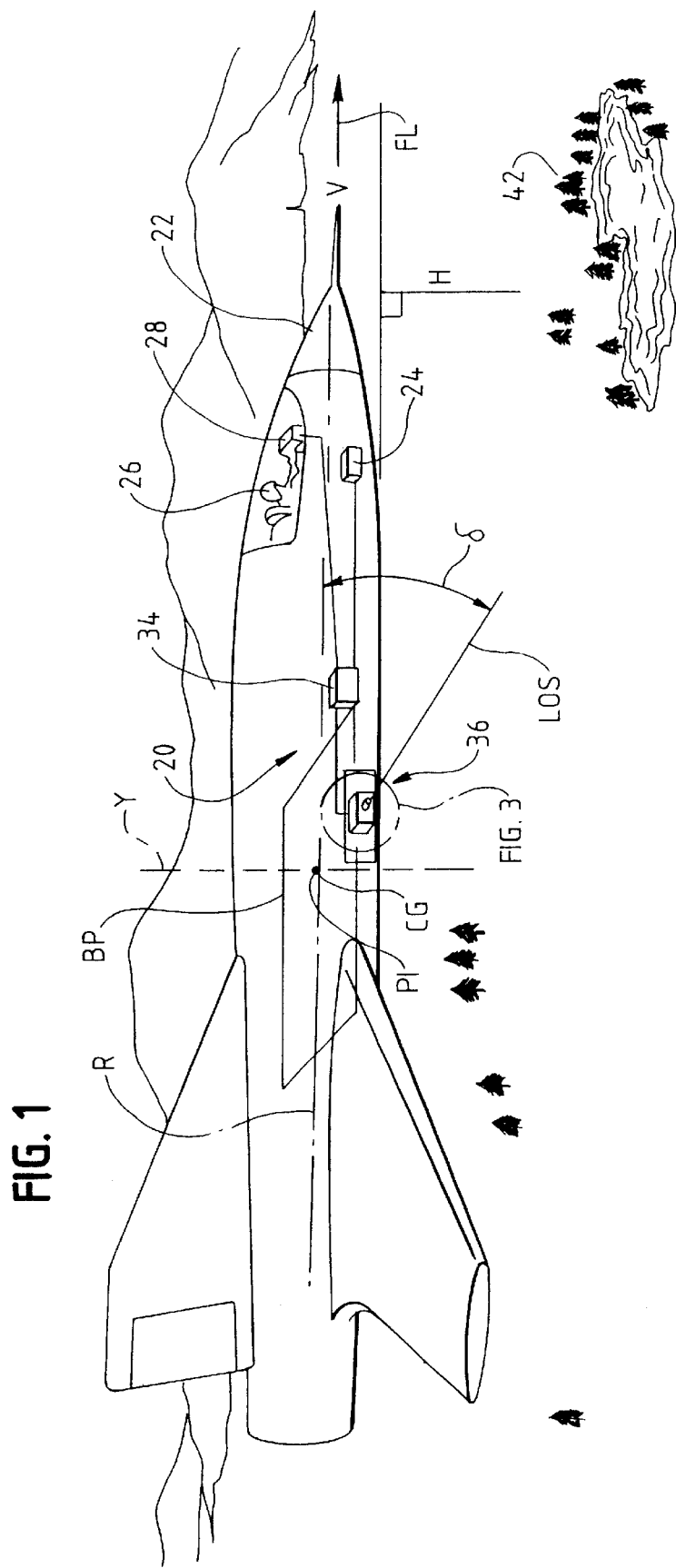
FIG. 1 is a perspective view of an aircraft flying over a terrain of interest with a camera in accordance with the preferred embodiment operating to generate frames of imagery of the terrain in two bands of the electromagnetic spectrum simultaneously.

Referring now to FIG. 1, an aerial reconnaissance camera system 20 in accordance with a preferred embodiment of the invention is shown installed in a reconnaissance aircraft 22 flying over a terrain of interest 42 at an altitude H and with forward velocity V, moving in a direction of flight FL. The aerial reconnaissance camera system 20 includes a camera 36, shown in greater detail in FIGS. 2A–2C and 3–5, a camera control computer 34 and associated electronics described in further detail in FIGS. 17 and 19. The camera control computer receives certain navigational information from the aircraft avionics system 24, including current aircraft velocity and height data. Additional camera system inputs may come from a console 28 in the cockpit, such as start and stop commands or camera depression (roll angle) settings.

The aircraft body defines a roll axis R, a pitch axis PI and a yaw axis Y passing through the center of gravity CG of the aircraft. The camera 36 is shown orientated at a camera depression angle δ relative to a bilateral plane BP that is horizontal during level flight. In the illustrated embodiment, the line of sight LOS of the camera 36 is nominally orthogonal to the roll axis in a side oblique or nadir orientation.

The preferred embodiment of the subject camera system 20 operates like a step-frame electro-optic (E-O) sensor, capable of taking a sequence of overlapped frames in the cross-track, i.e., cross-line of flight, direction. This is shown in FIG. 2. As the aircraft flies by the terrain of interest, the camera is rotated about the roll axis in a continuous fashion (i.e., without starts and stops between frames), with frames of imagery taken at different depression (roll) angles, e.g., angles δ1, δ2, δ3, δ4 and δ5, resulting in frames 1, 2, 3, 4 and 5. A nominal rate of rotation about the roll axis is used (based on focal length, array frame size and framing rate, such as 8–10 degrees per second, but the roll rate is adjustable by the camera control computer. When the fifth frame of imagery is obtained and the camera rolled to its roll limit position (either pre-set or commanded by the operator), the camera rotates back, i.e., retraces, to its initial roll position (δ1), and the second cycle of frames of imagery is obtained (1A, 2A, 3A, 4A, 5A). The process repeats for a third and subsequent cycles of operation.

The cross-track framing sequence 1, 2, 3, 4, 5; 1A, 2A, 3A, 4A, 5A; etc. (which is V/H dependent) can be made in either spectrum individually or in both spectrums simultaneously, dependent on the time of day and the purpose of the reconnaissance mission. As noted in FIG. 2, the roll action of the camera can encompass both sides of nadir, for example with frames 1–4 obtained at one side of nadir and frame 5 obtained at the other side of nadir. The camera can also be used in a spot mode, in which the camera is rotated to a particular depression angle and frames of imagery obtained of the scene of interest. The number of frames per cycle of roll, N, can thus vary from 1 to say 5 or 10 or until horizon to horizon coverage is obtained.

Figure 2A:
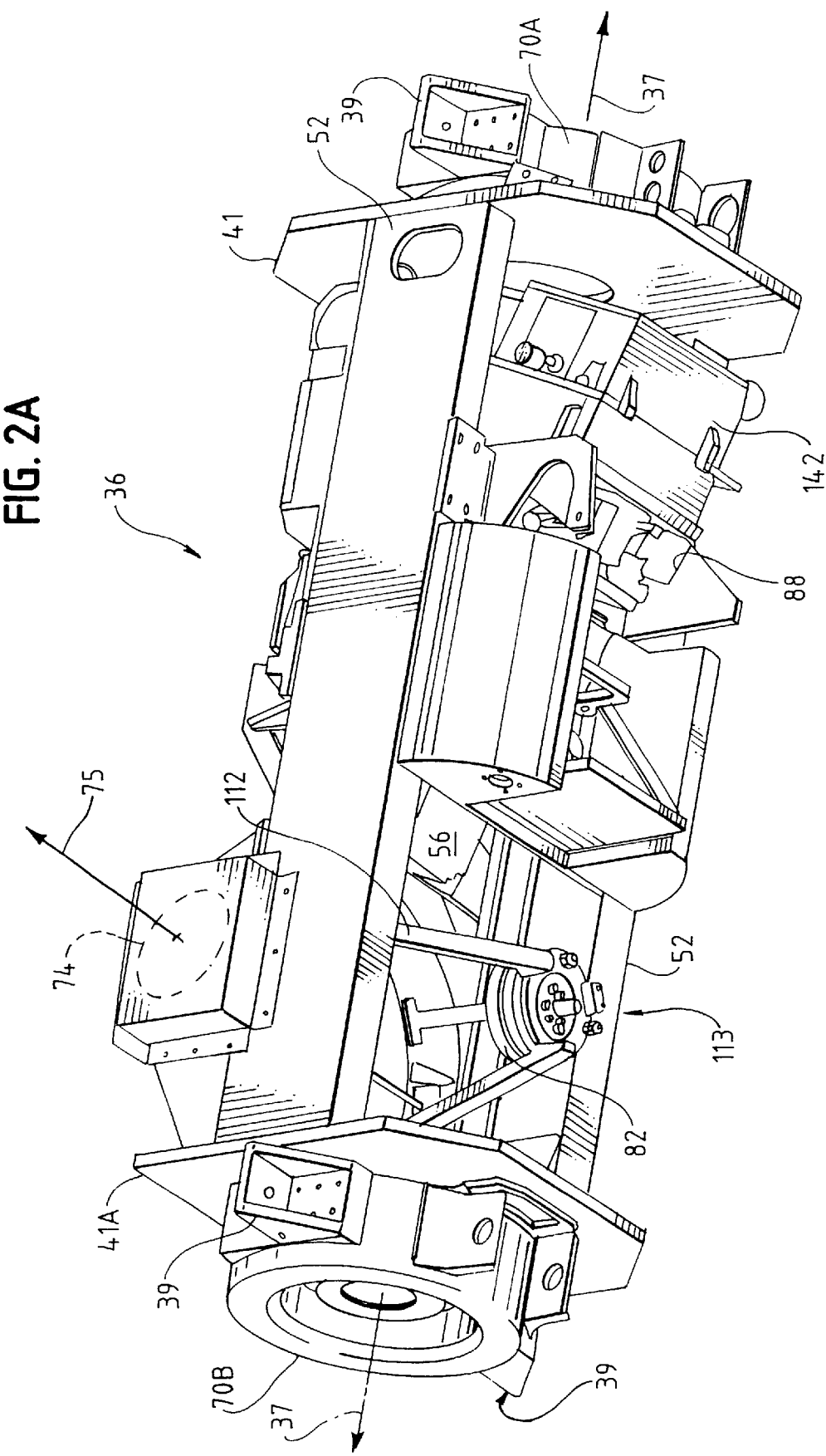
Figure 2C:
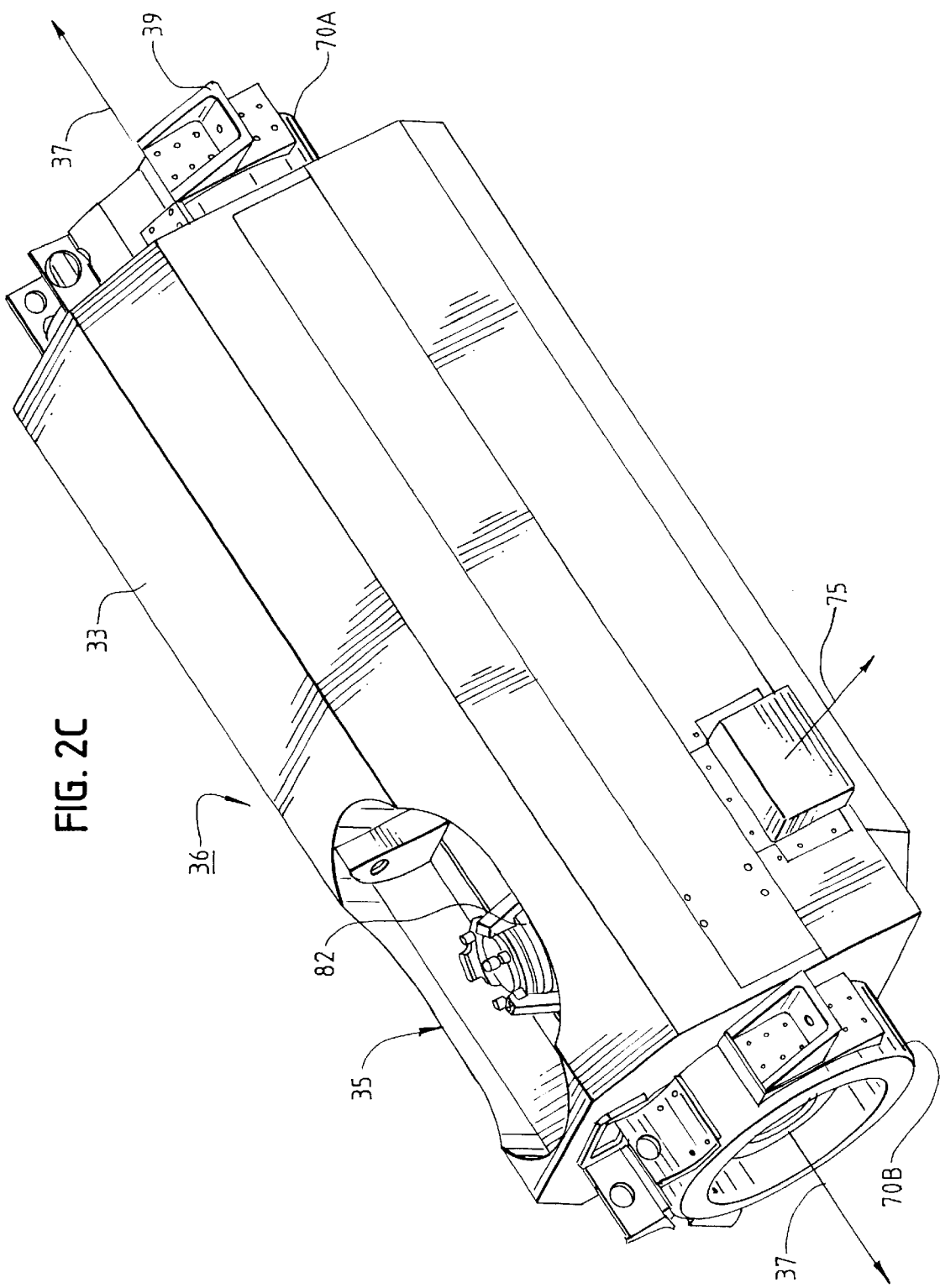
FIG. 2C is a perspective view of the camera of FIGS. 2A and 2B, with the protective covers installed, and showing the entrance aperture for the catoptric Cassegrain optical system.
Figure 3:
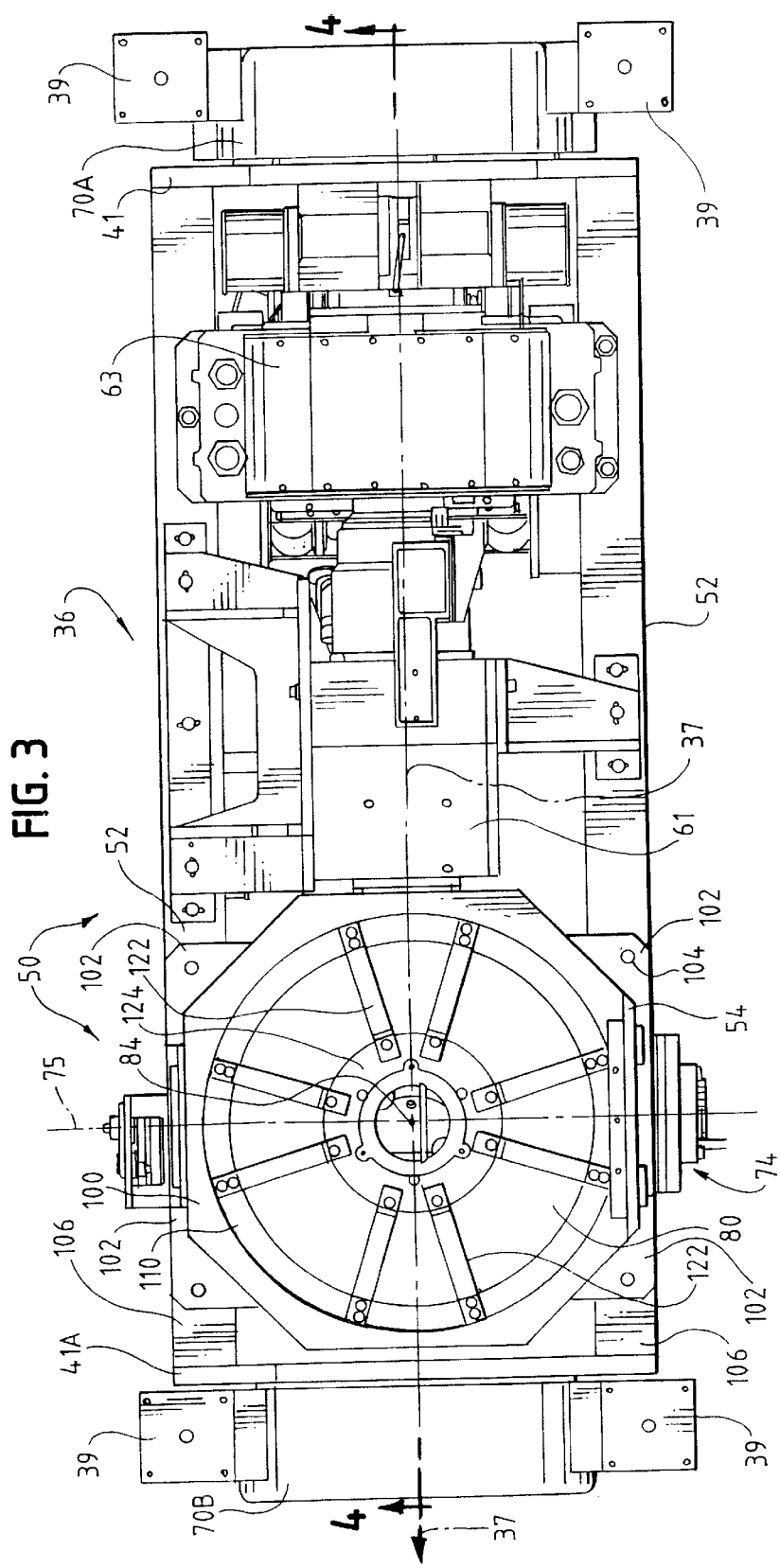
FIG. 3 is a top plan view of a presently preferred embodiment of the dual band framing reconnaissance camera system of FIGS. 2A–2C, with the covers removed.
Figure 4:
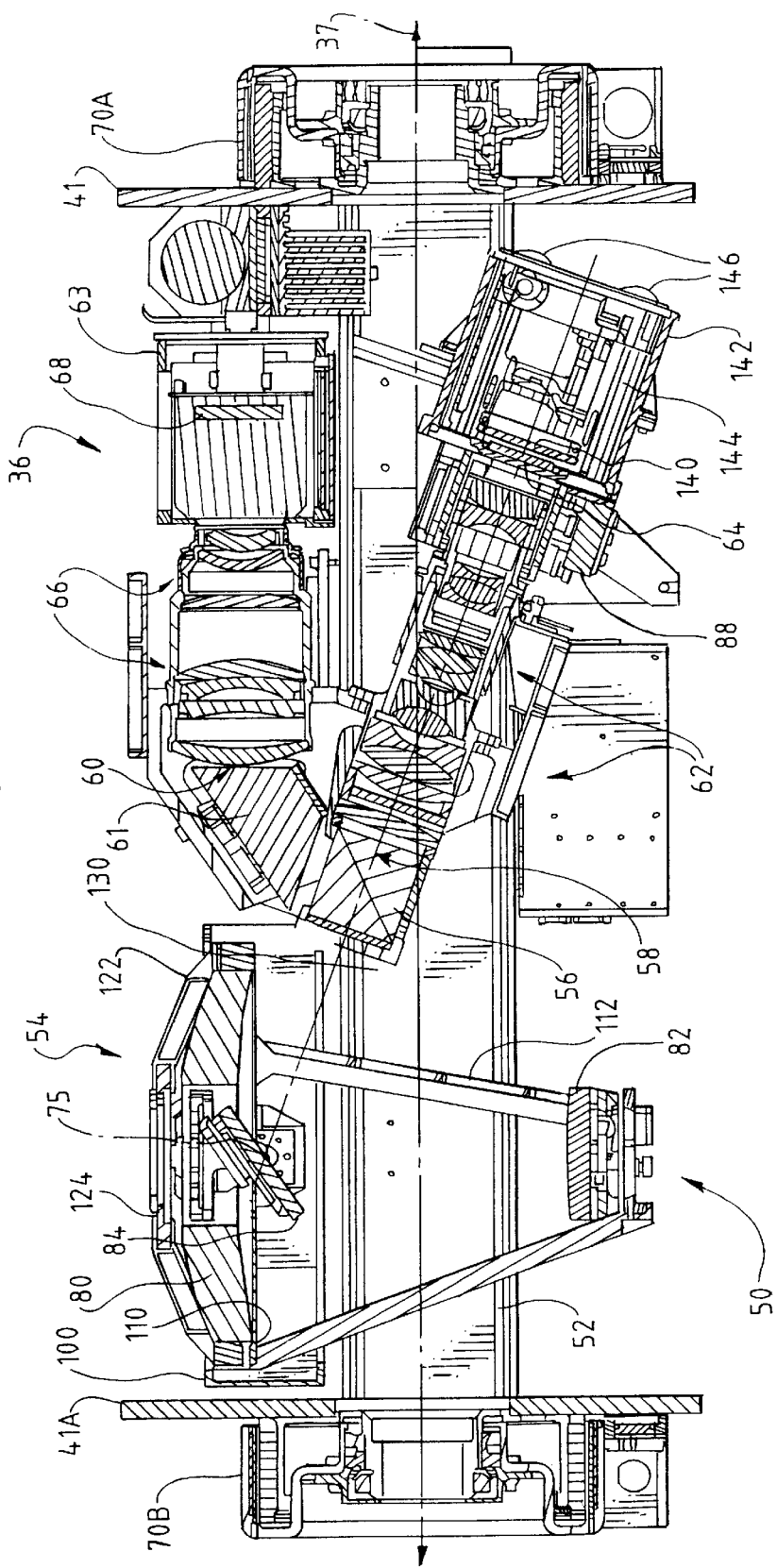
FIG. 4 is a cross-sectional view of the camera system of FIG. 3, taken along the lines 4—4 of FIG. 3.
Figure 4B:
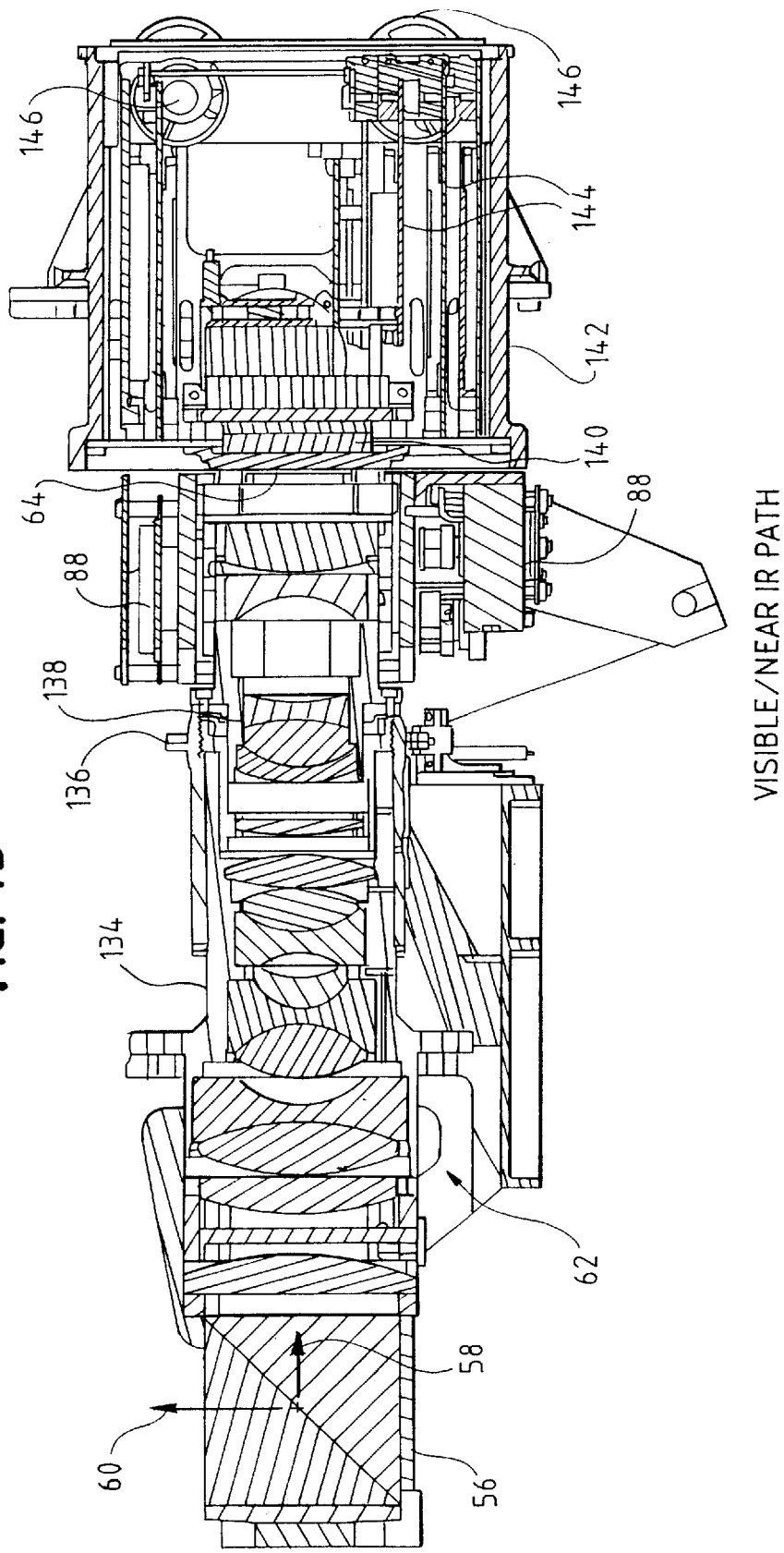
FIGS. 4B and C are more detailed cross-sectional views of the optical elements in the visible and MWIR paths of FIGS. 4 and 4A.
Figure 4C:
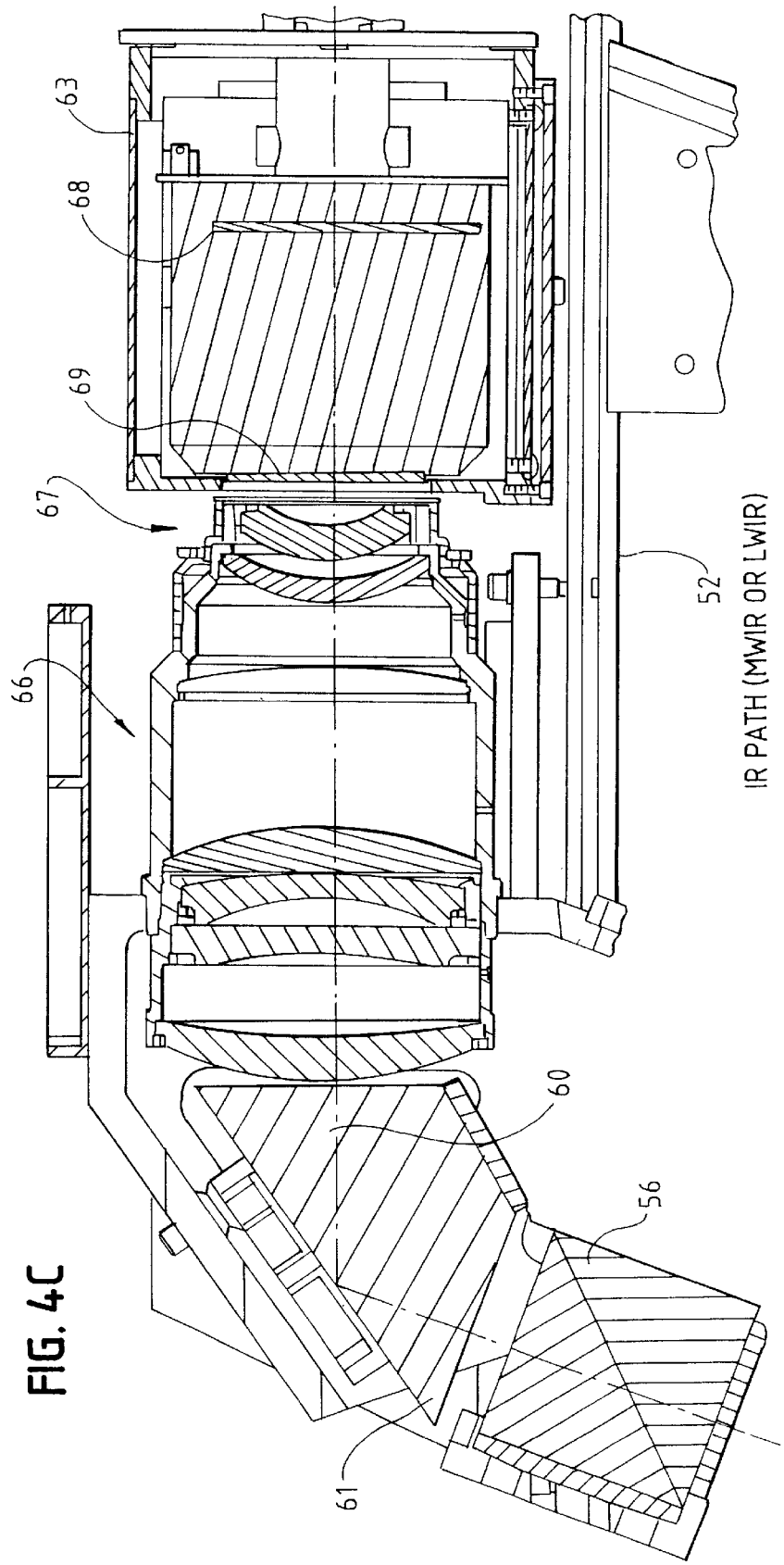
FIG. 4A is a simplified ray diagram of the optical system of FIG. 3 and 4.

FIG. 2A shows the camera 36 in a perspective view as seen from below, with a set of protective cover plates removed in order to better illustrate the structure of the camera. FIG. 2B is another perspective view, shown from above, and FIG. 2C is a perspective view of the camera 36 with the cover plates 33 installed, showing the entrance pupil 35 for the camera. Referring now to FIGS. 3–5, the camera 36 per se is shown in top, sectional and end views, respectively. In the end view of FIG. 5, a rear support plate 41 and a roll motor 70A are removed in order to better illustrate the rest of the camera 36.

Figure 12:
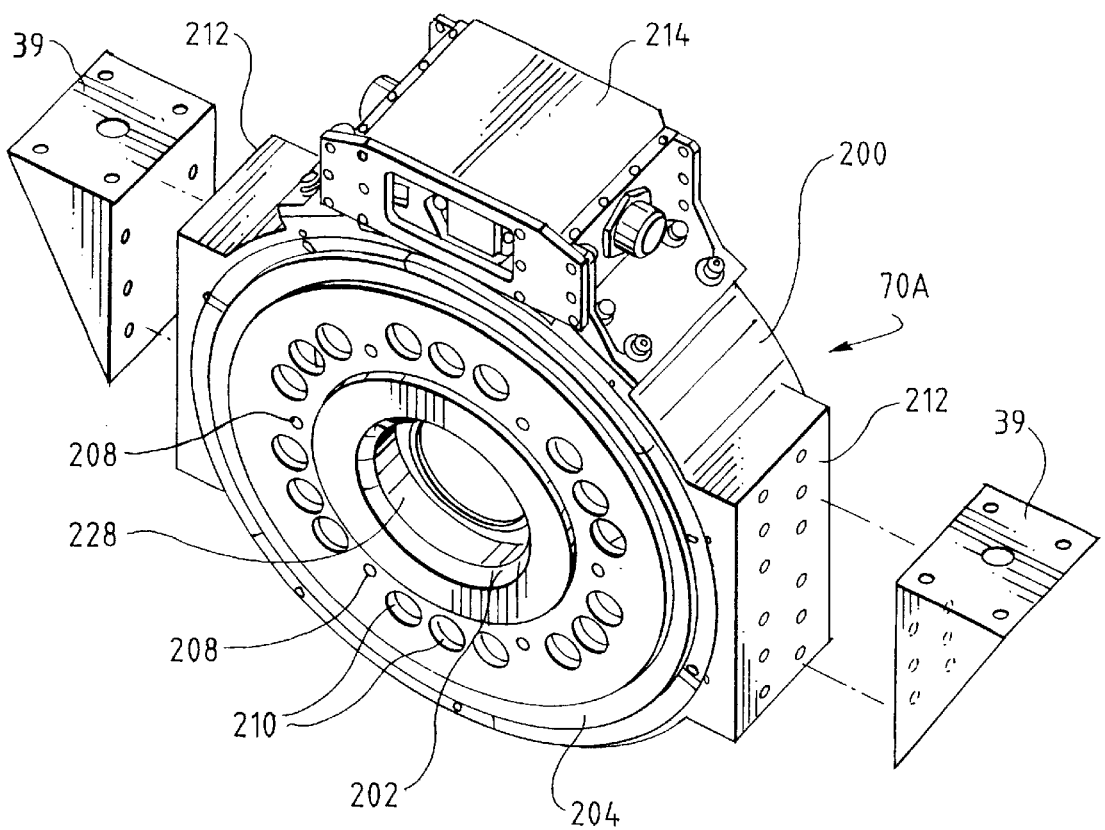
FIG. 12 is a detailed perspective view of one of the roll motor assemblies of FIG. 2, showing the L shaped brackets that mount to the stator of the motor and rigidly couple the roll motor to the pod or aircraft.

As shown best in FIG. 3, the camera 36 mounts to the reconnaissance pod or airframe of the aerial reconnaissance vehicle via four mounting brackets 39, each connected to the pod or airframe via passive shock isolation mounts in conventional fashion. The mounting brackets 39 are bolted to the sides of the stator of the roll motor assemblies 70A and 70B as shown in FIG. 12 and described below. The entire camera cylinder comprising all the components between the two support plates 41 and 41A can rotate relative to the roll axis 37 while the stator of the roll motors 70A and 70B and mounting brackets 39 remain in a fixed position relative to the aerial reconnaissance vehicle.

The basic configuration of the camera 36 is a cylinder, as perhaps best illustrated in FIG. 2C, which in the illustrated embodiment is approximately 20 inches in diameter and 48 inches in length. The camera 36 is installed in an aircraft reconnaissance pod via the mounting brackets 39 such that the cylinder axis 37 is oriented nominally parallel to the flight direction of the aircraft, i.e., the roll axis of the aircraft. The fore/aft orientation of the camera can be either way. Additionally, the camera 36 can be installed such that it is oriented perpendicular to the line of flight.

A typical use of the camera is to take overlapping frames of images in the cross-track direction as the aircraft flies over the scene of interest as shown in FIG. 2, similar in concept to the step frame operation described in the prior art patent of Lareau, et al. U.S. Pat. No. 5,668,593 and earlier step frame film cameras. However, the manner in which the camera achieves this result is very different from that taught in the prior art. Whereas in the Lareau '593 patent, a stepping mirror is rotated in discrete steps to image the terrain, and forward motion compensation is performed in the array itself electronically, in the preferred embodiment of the present invention the entire camera 36 is rotated at a constant angular velocity, and in a continuous fashion, about the roll axis 37. The roll rate is determined by the optical system focal length, frame size, frame rate and the desired cross-track overlap (typically 5%) between consecutive frames. Moreover, forward motion compensation is achieved by means of rotation of the Cassegrain optical system about an axis 75, as described below, not in the array.

Referring to FIGS. 3 and 4, the camera includes an optical system 50 which is incorporated into (i.e., mounted) a camera housing or superstructure 52. The optical system 50 in the preferred embodiment comprises a novel catoptric Cassegrain objective optical subassembly 54 which receives incident radiation from a scene external of the vehicle. FIG. 4A shows a simplified ray diagram for the optical system 50. The Cassegrain objective optical subassembly includes a primary mirror 80, a secondary mirror 82 and a flat azimuth mirror 84. The secondary mirror 82 is centrally located in the entrance aperture of the Cassegrain optical system. Radiation from the scene is reflected from the Cassegrain objective subassembly 54 to a spectrum-dividing prism 56. The prism 56 directs radiation in a first band of the electromagnetic spectrum, such as visible and near IR, into a first optical path 58 and directs radiation in a second band of the electromagnetic spectrum, such as mid-wavelength IR or long wavelength IR, into a second optical path 60 different from the first optical path. The first optical path 58 includes suitable image forming and focusing lenses 62 and a first two-dimensional image recording medium 64 for generating frames of imagery in the first band of the electromagnetic spectrum. The second optical path 60 includes a fold prism 61, suitable image forming and focusing lenses 66 and a second two-dimensional image recording medium 68 which generates frames of imagery in the second band of the electromagnetic spectrum.

The camera further includes a novel servo-mechanical subsystem. This subsystem includes a first motor system 70A and 70B coupled to the camera housing 52 that rotates the camera housing 52 (including the optical system 50 as recited above) about the roll axis 37. The image recording media 64 and 68 are exposed to the scene to generate frames of imagery as the first motor system 70A and 70B rotates the camera housing 52 in a continuous fashion about the roll axis 37. The first and second image recording media have a means for compensating for image motion due to the rotation of the camera housing. In an electro-optical embodiment of the image recording media, the roll motion compensation means is preferably comprised of electronic circuitry for clocking or transferring pixel information through the electro-optical detectors at a uniform rate substantially equal to the rate of image motion due to camera rotation. A method of calculating the image motion rate, and thus pixel information transfer rate, due to roll of the camera housing is described below. If a film camera is used for the image recording media, a mechanical system is used to move the film at a rate substantially equal to the image motion rate. Film drive mechanisms for moving film for purposes of motion compensation are known in the art and can be adapted for a film framing camera for purposes of roll motion compensation by persons skilled in the art.

Figure 6:
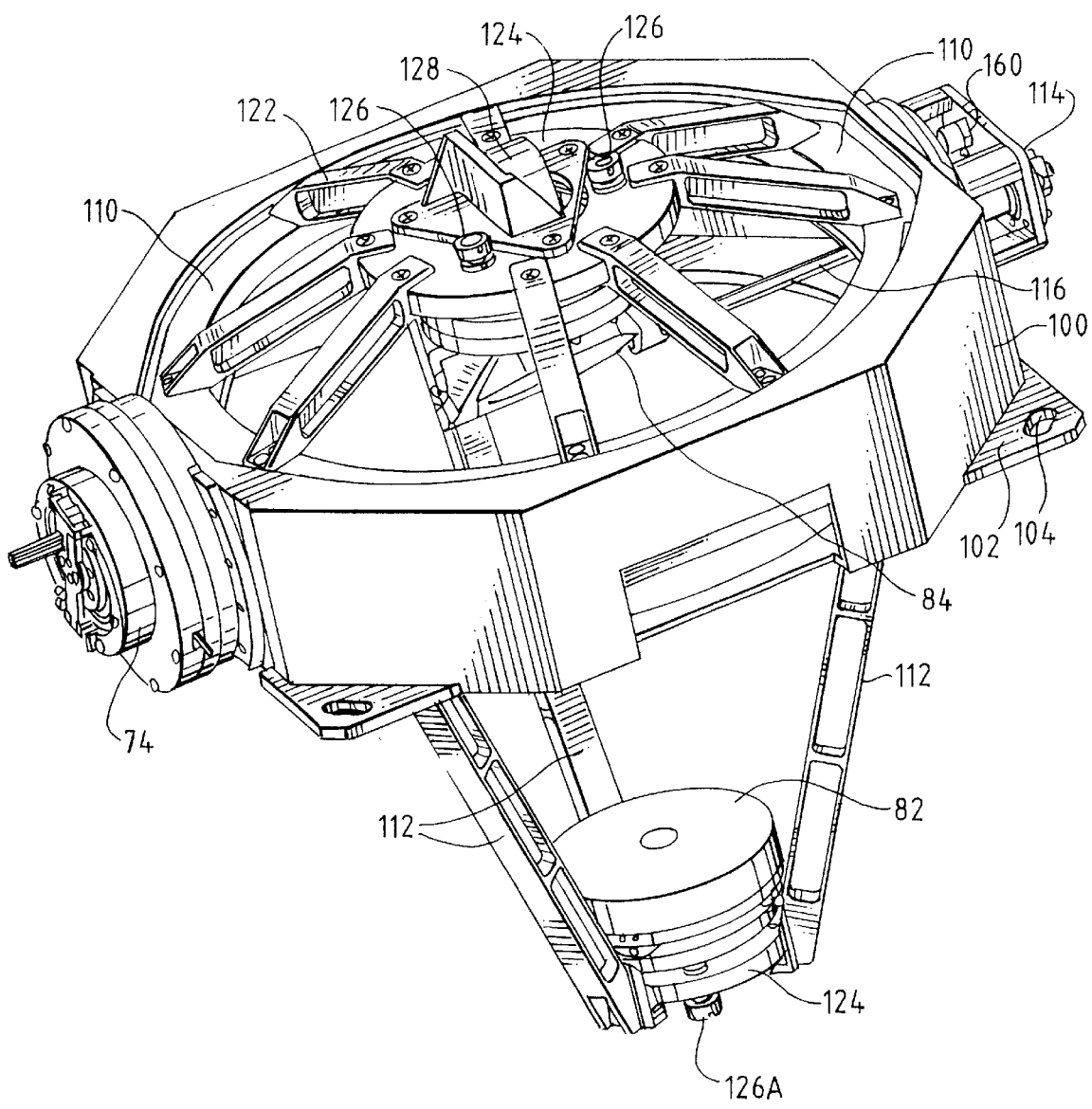
FIG. 6 is a perspective view of the assembly of the Cassegrain subsystem, showing in better detail the structure that retains the Cassegrain primary mirror and showing the secondary mirror, azimuth mirror, Cassegrain motor assembly and azimuth 2-1 drive assembly in greater detail. The primary mirror itself is removed from FIG. 6 in order to better illustrate the components of the Cassegrain optical system.

The servo-mechanical subsystem also includes a second motor system 74, shown best in FIGS. 3, 5 and 6, coupled to the front end of the Cassegrain optical system 54. The second motor system 74 rotates the Cassegrain objective subassembly 54, including the primary, secondary and azimuth mirrors, about a second axis 75 in the direction of forward motion of the reconnaissance vehicle in a manner to compensate for forward motion of the aerial reconnaissance vehicle. In the illustrated embodiment, the azimuth mirror 84 is rotated about the axis 75 at one half the rate of rotation of the Cassegrain primary and secondary mirrors 80 and 82 in the direction of forward motion. The action of the first motor assembly 70A and 70B to rotate the entire camera housing about the roll axis occurs at the same time (i.e., simultaneously with) the action of the second motor system 74 to rotate the Cassegrain optical system 80, 82 and 84 in the line of flight to accomplish forward motion compensation. The net effect of the action of the Cassegrain motor system 74 and the roll motion compensation technique is that the image of the scene of interest is essentially frozen relative to the focal plane of the image recording media while the image recording media obtain the frames of imagery, allowing high resolution images of the scene in two different bands of the spectrum to be obtained simultaneously.

During operation, as the entire camera 36 rotates by action of the roll motors 70A and 70B, exposure of the detectors 64 and 68 at the two focal planes is made. In the illustrated embodiment, in the visible spectrum path 58 the exposure is executed by means of a mechanical focal plane shutter 88 which opens to allow incident photons to impinge on a two-dimensional charge-coupled device E-O detector array 64. In the MWIR path 60, exposure is executed by electronic switching (on/off) of IR-sensitive photocells arranged in a two-dimensional array 68, basically by dumping charge accumulating prior to the initiation of exposure and then accumulating and storing charge when the exposure period commences. However, any method of exposure control will work with this roll-framing camera.

When the initial exposure is complete, the data is read out from the two focal plane detectors 64 and 68 and they are placed in condition for a second exposure. The rotation of the entire camera assembly about the roll axis 37 continues smoothly (that is, without starting and stopping as for example found in a prior art step frame camera system). When the next exposure is ready to be taken, i.e., when depression angle δ2 of FIG. 2 has been reached, the shutter is opened in the visible/near IR path; similarly, in the MWIR path the charge dumping ceases and charge is accumulated. The data is then read out of the two focal plane sensors after the exposure period is over. Meanwhile, the rotation of the entire camera system about the roll axis continues without interruption and a third and subsequent exposure of both cameras is taken if time permits. The process continues until the angular limit of the framing cycle has been reached, at which time the roll motors 70A and 70B retrace their angular rotation and return to their original angular position. The process then repeats for a new cycle of framing, as indicated in FIG. 2.

The camera system roll rate (the cylinder angular velocity), ω, is established as follows. First, determine the cross-track field of view per frame, Φ, according to equation (1):

$$\Phi = 2 \text{ARCTAN}(W/2f), \text{ where} \qquad (1)$$

W=detector array size in the cross-track direction; and

ƒ=lens focal length (i.e, the focal length of the overall aggregate of optical components in the particular band of interest, e.g., the visible band). Then, the cylinder angular velocity (ω is computed according to equation (2):

$$\omega = \Phi(FR)(1-OL_c), \text{ where} \qquad (2)$$

FR=system frame rate (frames per second)

$OL_c$=overlap between consecutive cross-track frames (expressed as a decimal).

Note that the cylinder angular velocity (ω is independent of the aircraft's velocity and height above the earth. Typical angular rotations between the successive exposures of the array will be less than 10 degrees.

Since the focal plane detectors are rotating about the roll axis during the exposure period, the scene image is translating across each of the detector arrays in the cross-track direction at a fixed velocity v=ƒω. The image motion due to camera roll is constant and uniform across the array. To compensate for this image motion, and thereby preserve resolution, this image motion is synchronized with the velocity at which charge representing scene information is transferred within the detector arrays, thus eliminating relative motion between the image and the pixels imaging the scene and thus eliminating the image smear that would otherwise take place at the detector. In other words, pixel information in the entire array is transferred in the direction of image motion from row to adjacent row at a rate that substantially matches the image velocity v.

At the end of the exposure period (typically 0.0005 to 0.020 seconds), the cylinder continues rotating to the next scene position while the collected scene signals are read-out of the detector array(s). Note that there is no rotational start and stop between exposures, as found in prior art step frame camera systems, thereby avoiding the servo loop settling times, load current surges, and power spikes produced by mechanical stepping systems as noted earlier.

In this "roll-framing" type of operation, the two focal plane detectors 64 and 68 operate in the above manner, taking N consecutive cross-track frames, N being dependent on the time available or by the intended mode (maximum coverage, limited coverage or spot mode) of operation. The result is a series of frames of images similar to that produced with a step frame camera system, as indicated in FIG. 2, each frame taken in two different bands of the electromagnetic spectrum. In maximum coverage mode, N is determined by the V/H ratio of the mission, the camera system depression angle range and the framing rate, and N can be as many as 10 frames/cycle (or more) in normal operation. At the end of the cross-track cycle, the camera system or cylinder is rotated back (reset) to the first frame angular position and the cycle repeats until the intended in-flight direction coverage is achieved. The camera can generate overlapping frames of imagery similar to that shown in FIG. 1, where N in the illustrated example=5.

In spot mode, a one or two frames/cycle is executed, with the camera aimed at a specific predetermined depression (roll) angle and fore/aft azimuth angle where a target or specific interest is expected to be. In this example, N will typically equal 1 or 2. The cycle may repeat for as many times as needed.

As another mode of operation, the camera could be used in a traditional step frame operation. In this mode, the camera would rotate between successive angular positions, and the photosensitive media would generate two-dimensional images of the terrain. If the camera body rotation is stopped during scene exposure, forward motion compensation could be performed in the photosensitive media, such as described in the earlier Lareau et al. patents.

The preferred forward motion compensation method will now be described with a little more specificity. As the exposures are made at either of the two detectors 64 and 68, the aircraft is moving at some known velocity. The forward motion of the aircraft is neutralized in a novel way in the preferred embodiment. Whereas in the prior art Lareau et al. '586 patent forward motion compensation is performed on-chip in the array, the forward motion compensation of the preferred embodiment is performed by rotation of the Cassegrain objective subassembly, i.e, the Cassegrain primary and secondary mirror assembly, in the flight direction at a rate=V/R (in units of radians per second) where V is the aircraft velocity and R is the range to the scene of interest. The value of R can be derived from simple geometry from the known aircraft height and camera depression angle (67$_i$) and assuming the earth is flat in the scene of interest, from a Global Positioning System on board the aircraft, using an active range finder, or by computing range from successive frames of imagery as described in the patent of Lareau et al., U.S. Pat. No. 5,692,062, which is incorporated by reference herein. As the Cassegrain primary and secondary mirrors 80 and 82, respectively, are rotated at the V/R rate in the direction of flight, the flat azimuth mirror 84, located in the optical path between the secondary reflector and the Cassegrain image plane 86, is rotated at a rate equal to ½ (V/R) in the same direction, thus "stopping" image motion due to aircraft forward motion at the image plane. Thus, the rotating Cassegrain objective lens and the half speed azimuth mirror provide the needed forward motion compensation function.

As an alternative embodiment, the Cassegrain optical system could remain fixed and both forward motion compensation and roll motion compensation could be performed in the focal plane detector by transferring pixel information in both row and column directions in accordance with the principles of the Lareau et al. patent, U.S. Pat. No. 5,798,786.

From the FIGS. 1–5 and 18 and the above discussion, it will be appreciated that we have invented a method of generating frames of imagery of a scene of interest with an aerial reconnaissance camera in two different bands of the electromagnetic spectrum simultaneously. The method includes the steps of:

(a) providing two photosensitive electro-optical detectors 64, 68 in the camera 36, each of the detectors comprising an array of pixel elements arranged in a plurality of rows and columns;

(b) rotating the camera 36 in a continuous fashion about a roll axis 37 either coincident with or parallel to a roll axis R of an aerial reconnaissance vehicle carrying the camera;

(c) while rotating the camera 36, simultaneously exposing the electro-optical detectors 64, 68 to a scene of interest in a series of exposures;

(d) while rotating the camera 36 and while exposing the electro-optical detectors 64 and 68 to the scene, rotating an optical system 54 providing an objective lens for the camera in the direction of forward motion of the vehicle at a predetermined rate to cancel out image motion due to forward motion of the vehicle; and (e) while the electro-optical detectors 64 and 68 are being exposed to the scene, moving pixel information in the arrays at a rate and in a direction substantially equal to the rate of image motion due to rotation of the camera about the roll axis, to thereby preserve resolution of images generated by the detectors.

Performance specifications for a presently preferred dual band step frame camera system in accordance with the invention are listed below.

| | Focal Length & f/# |
|---|---|
| Visible Channel | 50.0 inches - f/4.0 |
| (Options) | 72.0 inches - f/5.8 |
| | 84.0 inches - f/6.7 |
| MWIR Channel | 50.0 inches - f/4.0 |
| | Optical System |
| Type: | Cassegrain objective lens with spectrum beam divider and individual visible channel and MWIR channel relay lenses. |
| | Operating Spectrums = |
| Visible Channel | −0.50 to 0.90 microns |
| MWIR Channel | −3.0 to 5.0 microns |
| | Entrance Pupil Diameter: |
| 12.5 inches, | both channels, all focal lengths. |
| | Detectors: |
| Visible Channel: | 5040 x 5040 pixels |
| | .010 mm x .010 mm pixel pitch |
| | 50.4 mm x 50.4 mm array size |
| | 4.0 frames/sec max. |
| MWIR Channel: | 2016 x 2016 pixels |
| | .025 mm x .025 mm pixel pitch |
| | 50.4 mm x 50.4 mm array size |
| | 4.0 frames/sec max. |
| MWIR Channel: | 2520 x 2520 pixels |
| (future) | .020 mm x .020 mm pixel pitch |
| | 50.4 mm x 50.4 mm array size |
| | 4.0 frames/sec max. |
| | FOV (per frame): |
| VIS Channel: | 2.27° x 2.27° (50 inch F.L.) |
| | 1.58° x 158° (72 inch F.L.) |
| | 1.35° x 1.35° (84 inch F.L.) |
| MWIR Channel: | 2.27° x 2.27° (50 inch F.L.) |
| Frame Rates: | Variable, up to 4.0 fr/sec |
| | Both channels, all focal lengths. |

-continued

| Pixel IFOV: | |
|---|---|
| VIS Channel: | $7.9 \times 10^{-6}$ RAD (50 inch F.L.) |
| | $5.5 \times 10^{-6}$ RAD (72 inch F.L.) |
| | $4.7 \times 10^{-6}$ RAD (84 inch F.L.) |
| MWIR Channel: | $19.7 \times 10.^{-6}$ RAD (50 inch F.L.) |
| | $15.8 \times 10^{-6}$ RAD (50 inch F.L.) (future) |
| Ground Resolvable Distance (GRD) (at range, perpendicular to the LOS). | |
| VIS Channel: | 3 ft @ 31 N mi. (NIIRS-5) (50") |
| | 3 ft @ 45 N mi. (NIIRS-5) (72") |
| | 3 ft @ 52 N mi. (NIIRS-5) (84") |
| MWIR Channel: | 3 ft @ 12.5 N mi. (NIIRS-5) (50") |
| (Future) | 3 ft @ 15.6 N mi. (NIIRS-5) (50") |
| Field of Regard: | Horizon to Horizon, or as limited by vehicle windows (5° to 30° depression below horizon (δ) is typical). |
| Scene coverage rate: | Variable cross-track. Roll rate: 8.6°/sec – (50 inch focal length, 4 Fr/Sec.) |

Preferred Dual Band Camera Detailed Mechanical and Servo-Mechanical Description

With the above overall description in mind, attention is directed primarily to FIGS. 2A, 2B, and 3–5. The more important mechanical aspects of the camera will now be described. The optical system 50, including the Cassegrain optical system, spectrum dividing prism 56, and optical components in the optical paths 58 and 60, are rigidly mounted to a camera housing or superstructure 52. This camera housing 52 takes the form of a pair of opposed, elongate C-shaped frames extending transversely on opposite sides of the roll axis substantially the entire length of the camera. The C-shaped frame members 52 provide a structure in which to mount the various optical and mechanical components of the camera, including the end plates 41 and 41A.

The end plate 41 is bolted to the right hand end of the C-shaped frames 52, as shown in FIG. 3. The rotor portion of the roll motor 70A is in turn bolted to the end plate 41, thereby coupling the rotational portion of the roll motor 70A to the camera frame 52. The stator portion of the roll motor 70A is fixedly coupled to the aircraft frame or pod via two L-shaped brackets 39 and the associated passive isolation mounts (conventional, not shown). The left-hand end of the C-shaped frame 52 is similarly bolted to an end plate 41A, and the rotor portion of the roll motor 70B is bolted to the end plate 41A, with the stator portion bolted to two L-shaped brackets 39. Two roll motors 70A and 70B are conventional frameless DC torque motors, adapted to mount to the camera 36. Two are used in the illustrated embodiment in order supply enough torque to rotate the camera housing 52 and all the attached components, but one motor may suffice if it is powerful enough. In the illustrated embodiment, the roll motors 70A and 70B are frameless DC torque motors, adapted to fit to the camera housing, a task within the ability of persons skilled in the art. The roll motors are described below in further detail in conjunction with FIGS. 12–15.

Figure 7:
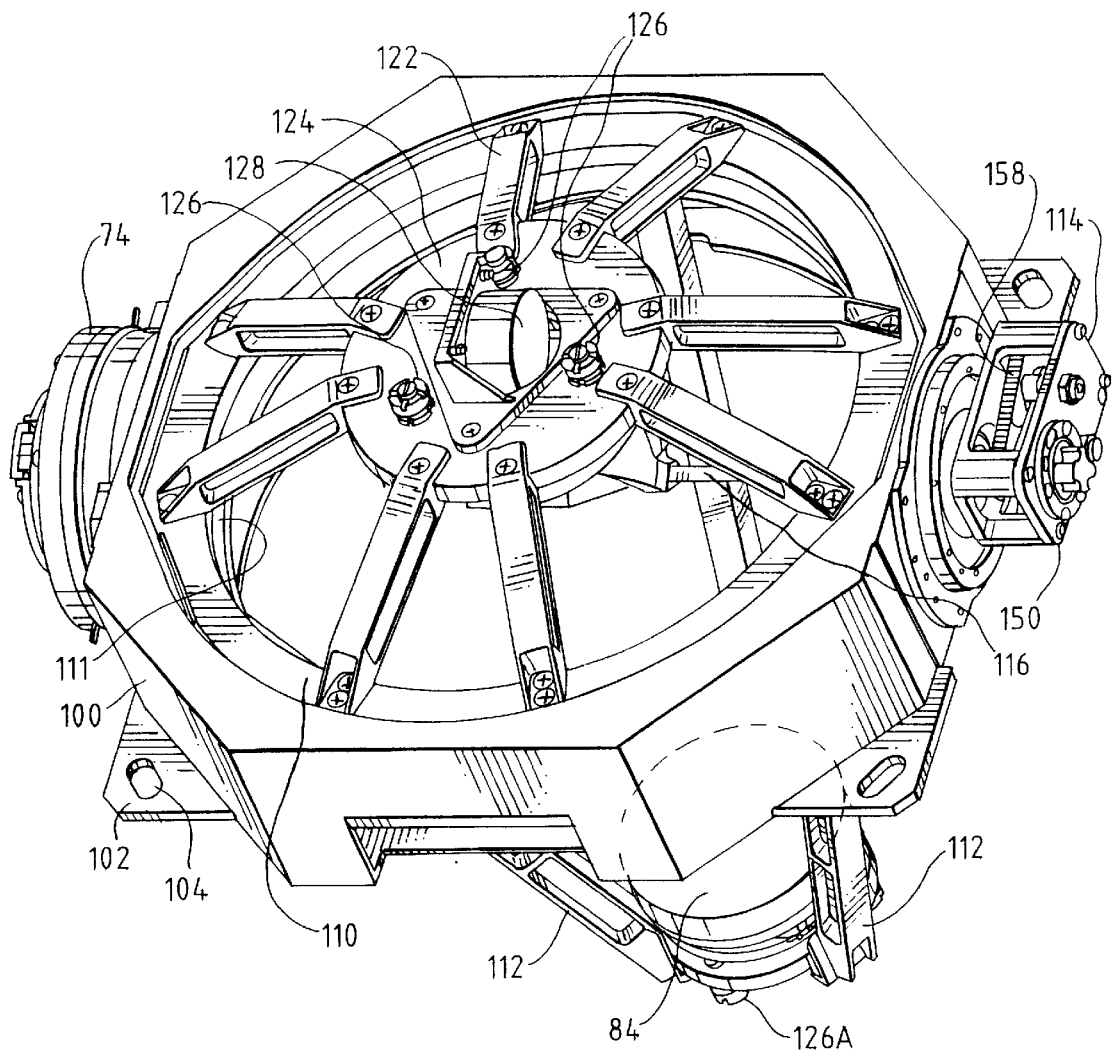
FIG. 7 is another perspective view of the Cassegrain primary mirror retaining assembly of FIG. 6.
Figure 8:
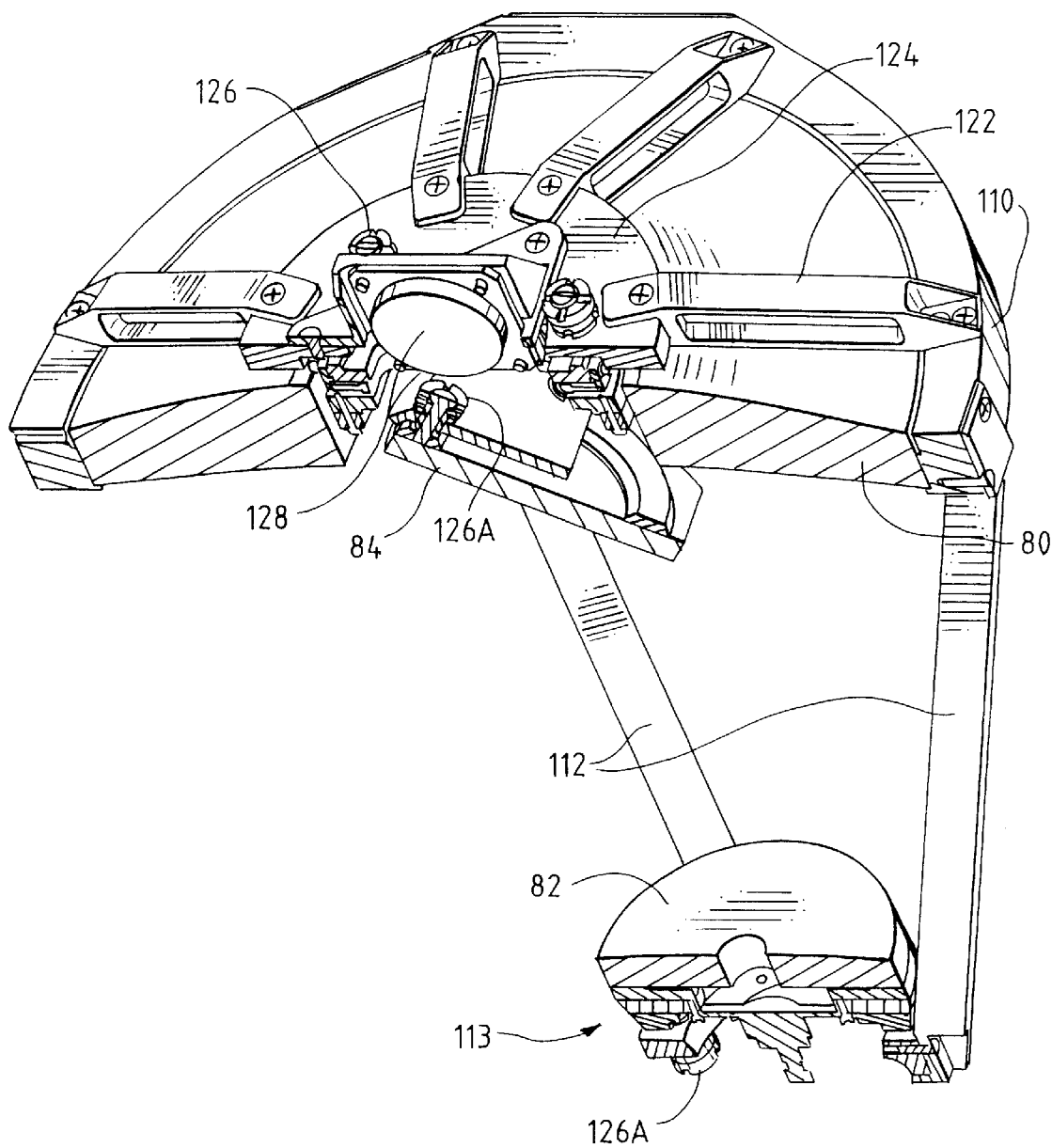
FIG. 8 is another perspective view of the Cassegrain primary mirror retaining assembly as seen generally from the rear, shown partially in section.
Figure 9:
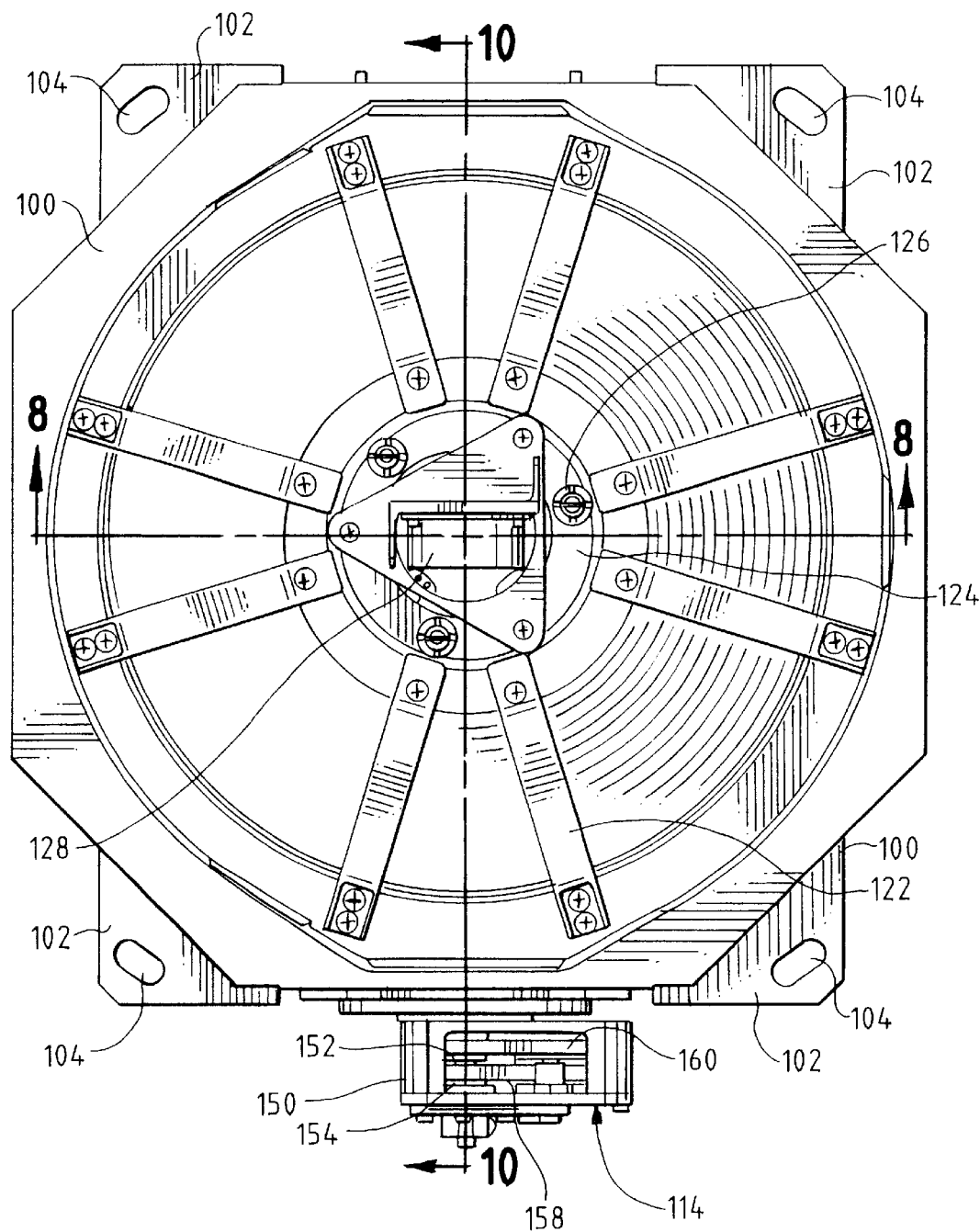
FIG. 9 is a top view of the Cassegrain optical system of FIG. 6.
Figure 10:
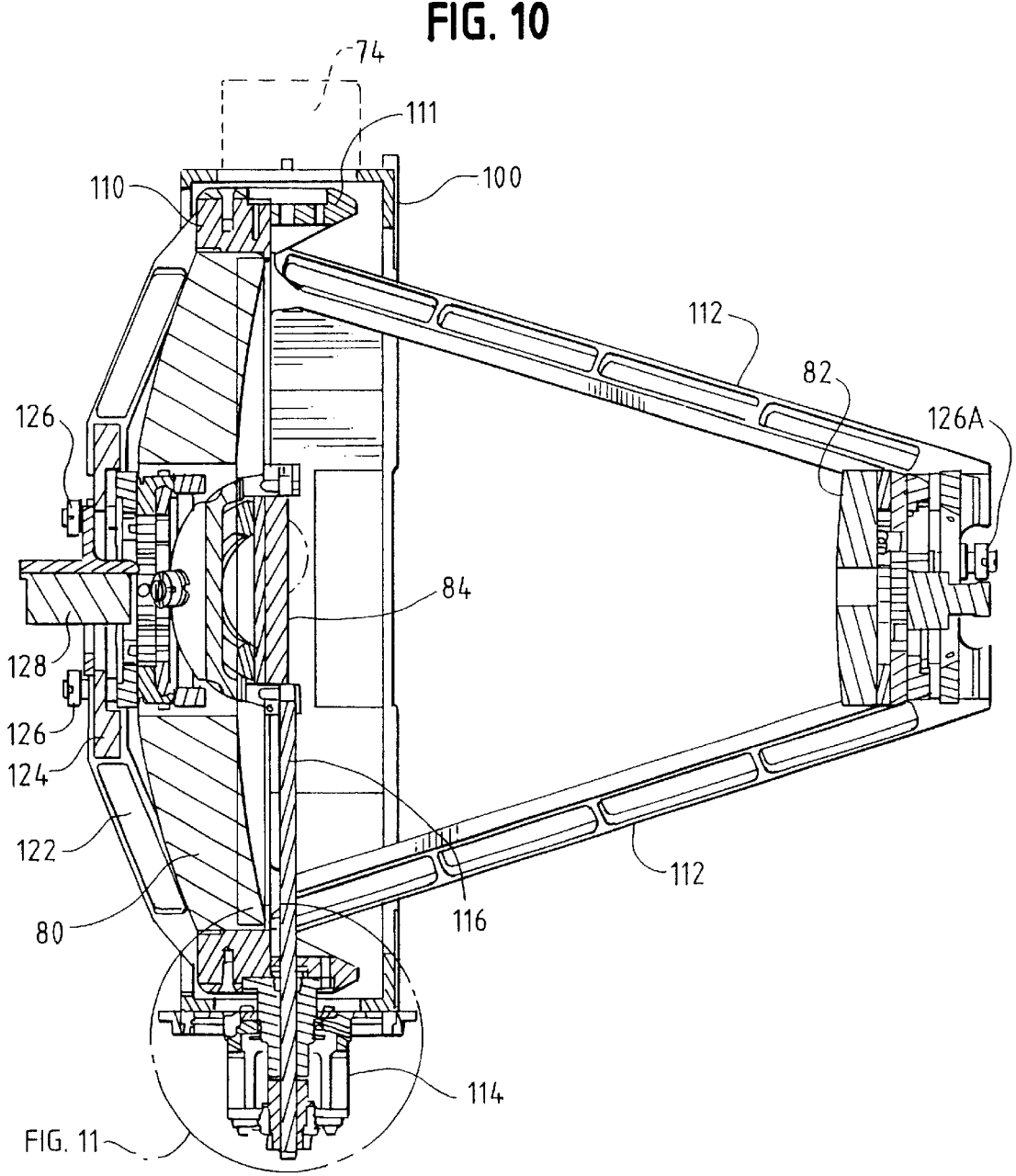
FIG. 10 is a cross-sectional view of the Cassegrain optical system of FIG. 6, taken along the line 10—10 of FIG. 9.

FIG. 3 is a top view of the camera 36, looking towards to the back side of the primary mirror 80. The Cassegrain objective lens optical subassembly 54 includes a primary mirror cell 100 which includes four mounting flanges 102 with bolt holes 104 for mounting via bolts to the top flange 106 of the C-shaped frames 52. The Cassegrain optical system is shown isolated in FIGS. 6–10. In FIGS. 6 and 7, the primary mirror is removed in order to better illustrate the rest of the structure in the Cassegrain optical system.

As is shown best in FIGS. 3 and 6, a spider 120 consisting of eight arms 122 extends between an inner primary mirror holding ring 110 and an azimuth mirror mounting plate 124 located at the center of the primary mirror 80. The mounting plate 124 incorporates three adjustment screws 126 for adjusting the tilt of the azimuth mirror 84. A fiber optic gyroscope 128 is also mounted to the plate 124 and is provided for purposes of inertial stiffness and stabilization of the Cassegrain optical system 50. The secondary mirror assembly 113 includes a set of three adjustment screws 126A for adjusting and aligning the orientation of the secondary mirror relative to the primary mirror.

The stator portion of the Cassegrain motor 74 is fixed with respect to the primary mirror cell 100. The rotor portion of the motor 74 is mounted to an annular ring 111 shown in FIG. 10, which is attached to the inner primary mirror holding ring 110. The secondary mirror 82 is fixed with respect to the primary mirror by means of three arms 112. Thus, the motor 74 rotates both the primary, secondary and azimuth mirrors about axis 75 in the direction of the line of flight in unison. The Cassegrain motor 74 is based on a DC direct drive motor adapted as required to the Cassegrain primary mirror holding structure, again a task within the ability of persons skilled in the art.

The rotation of the inner mirror holding ring 110 by the Cassegrain motor 74 is reduced by a two-to-one reduction tape drive assembly 114, shown best in FIGS. 5, 6 7, 9 and 11. The tape drive assembly 114 rotates an azimuth mirror drive shaft 116 that extends from the tape drive assembly 114 to the azimuth mirror 84. The azimuth tape drive assembly 114 rotates the azimuth mirror drive shaft 116 and thus the azimuth mirror 84 at one half of the rate of rotation of the primary and secondary mirrors by the Cassegrain motor 74.

Figure 11:
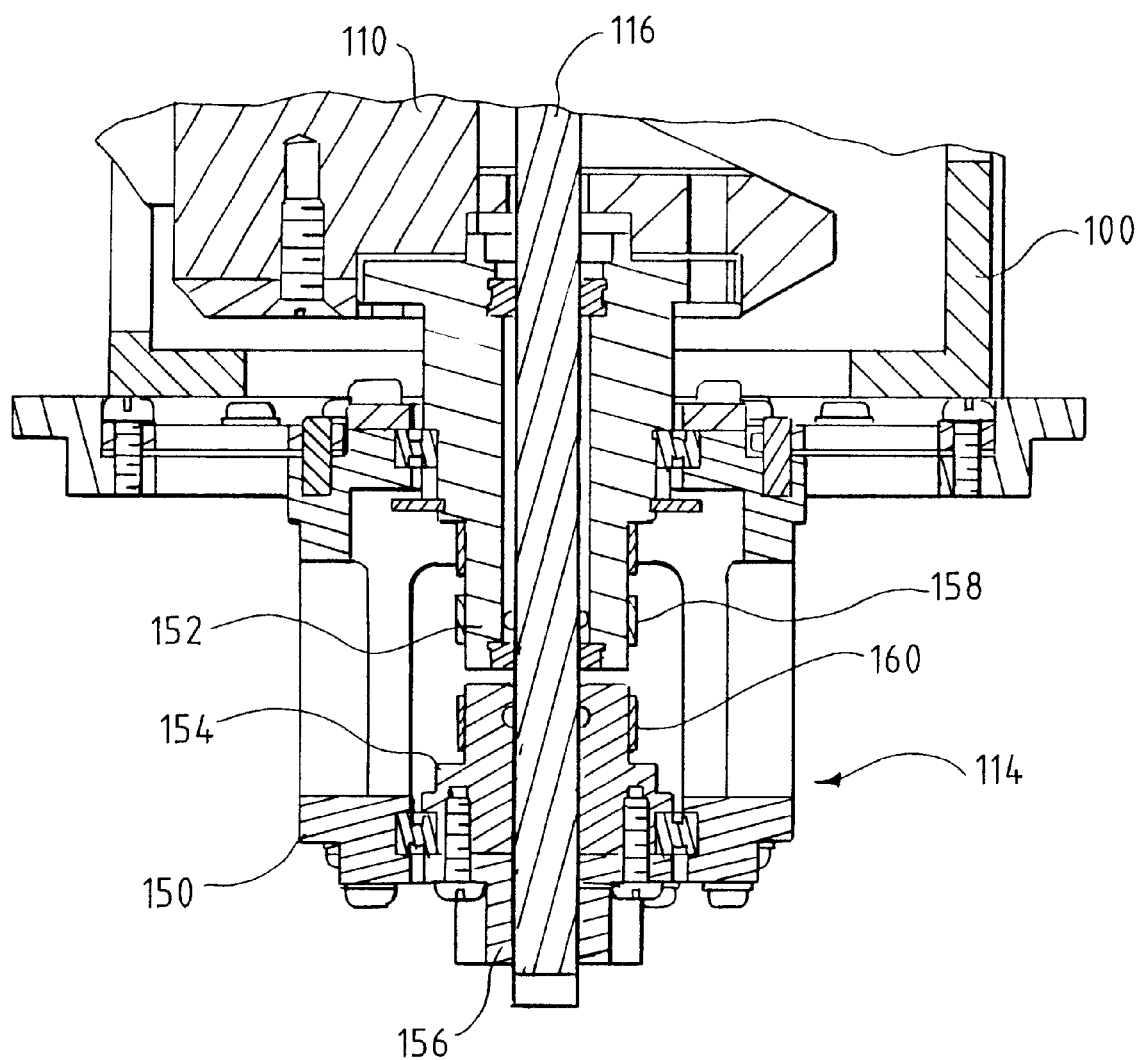
FIG. 11 is a detailed sectional view of the azimuth mirror 2-1 drive assembly that rotates the azimuth mirror at one half the rate of rotation of the entire Cassegrain optical subsystem.

The tape drive assembly 114 includes a two-to-one drive housing 150, two-to-one drive couplings 152 and 154, a shaft locking coupling 156, and a pair of stainless steel tapes 158 and 160, the thickness of which is shown exaggerated in FIG. 11.

Figure 13:
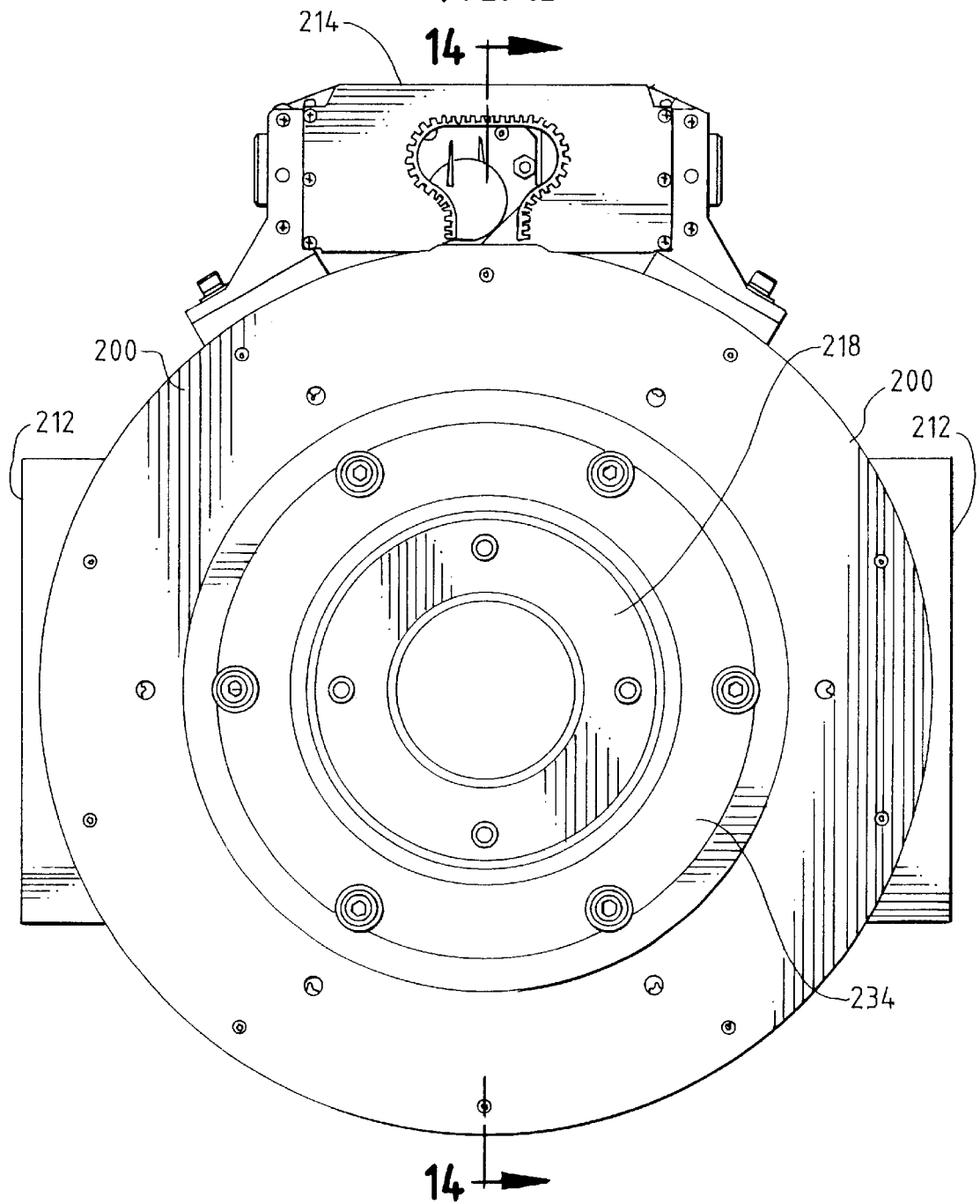
FIG. 13 is an elevational view of the roll motor of FIG. 12.
Figure 14:
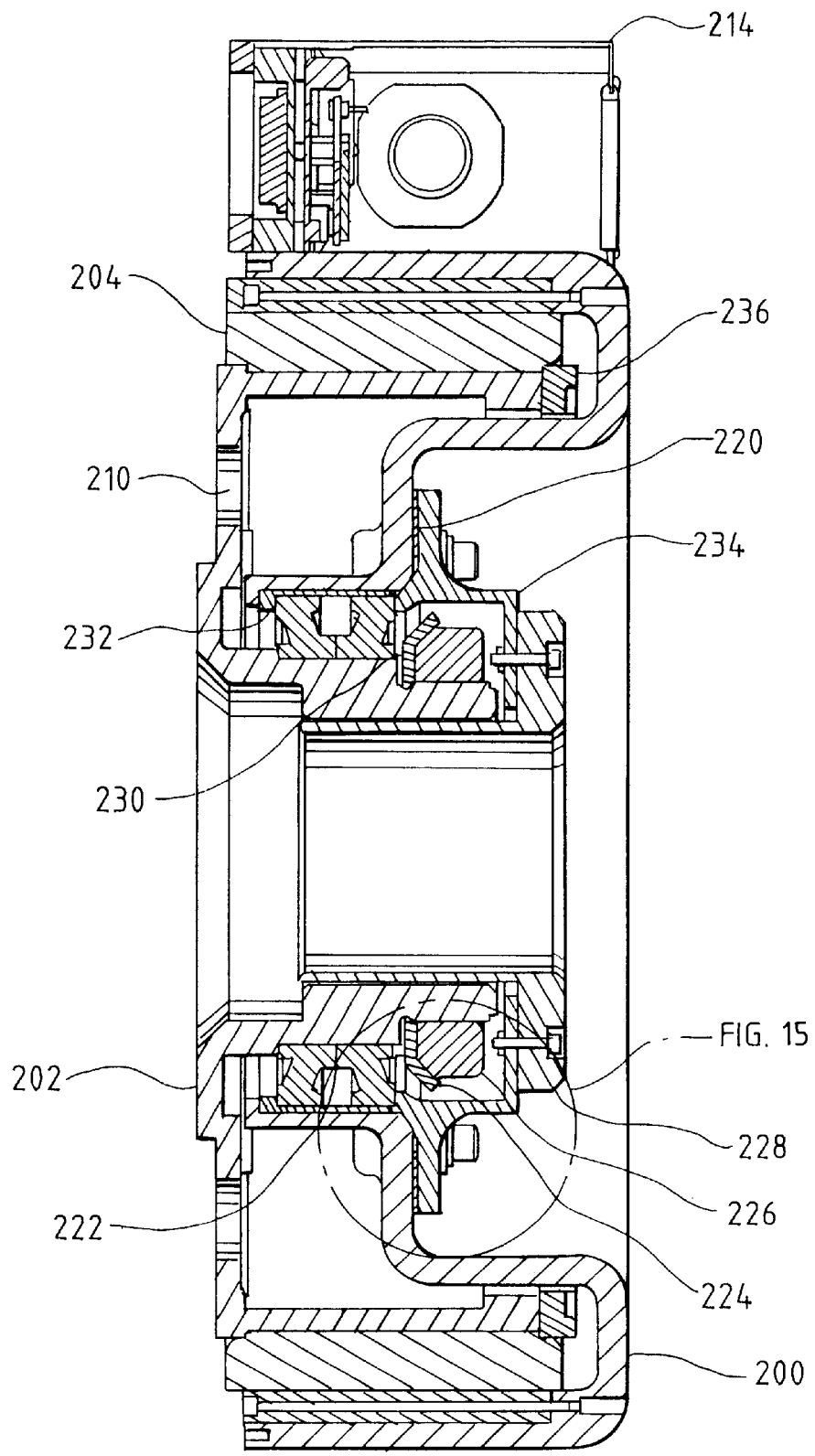
FIG. 14 is a cross-sectional view of the roll motor of FIG. 14.

Referring to FIG. 12, the roll motor 70A is shown isolated from the rest of the camera in a perspective view. FIG. 13 is an elevational view of the motor as seen from the other side. FIG. 14 is a cross-sectional view of the motor 70A. The roll motor 70B is identical to the motor of FIGS. 12–14. Additional details concerning the tape drive assembly 114 are conventional and therefore omitted for the sake of brevity.

The motor 70A includes a trunnion 200, a journal 202 and a DC frameless motor 204. The journal 202 bolts to the plate 41 (FIG. 3) via six bolt holes 208. A set of apertures 210 is provided in the face of the journal 202 to reduce weight. The sides of the trunnion 200 have opposed, parallel flat surfaces 212 with a series of mounting holes for enabling the L-shaped mounting brackets 39 to mount to the trunnion 200 in a plurality of different positions. The motor 70A also includes an electronics module contained in a housing 214. The module includes a power amplifier and associated DC electronic components, which are conventional.

Figure 15:
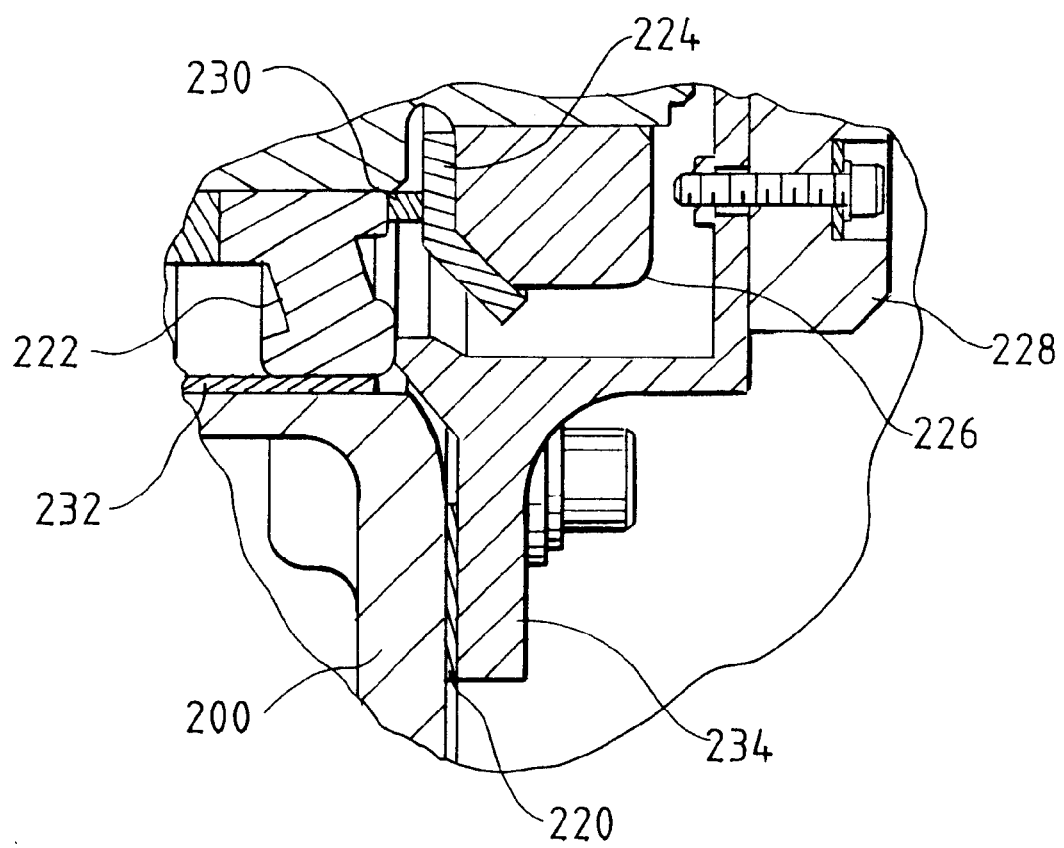
FIG. 15 is a detailed illustration of a portion of the roll motor of FIG. 14.

As shown in the cross-sectional view of FIG. 14, and the detail of FIG. 15, the motor assembly 70A also includes an annular shim 220, an annular bearing 222, a lock washer 224 and locking nut 226, a trunnion sleeve 228, a bearing spacer 230, a bearing insert 232 and a bearing adjustment plate 234. Additional mechanical features shown in FIGS. 14 and 15 are not particularly important and therefore are omitted from the present discussion.

Optical System Detailed Description

The optical system design of the subject camera is driven by the need to illuminate a large focal plane image recording medium and by space constraints, namely the total axial length and the total diameter, which have to be accounted for in potential aircraft installation applications. Thus, while the particular optical design described herein is optimized for a given set of spatial constraints, variation from the illustrated embodiment is considered to be within the scope of the invention.

The optical system 50 of FIGS. 3 and 4 represents a 50-inch, F/4 optical system designed to operate over an extended spectral region. The objective lens module consists of the Cassegrain optical subsystem 54, comprising the primary and secondary mirrors 80 and 82. The azimuth mirror 84 is utilized to redirect the image forming light bundles into the remainder of the optical system, namely the spectrum dividing prism and the relay lenses and other optical components in the optical paths 58 and 60.

Referring now again primarily FIGS. 4, 4A, 4B and 4C, radiation is reflected off the flat azimuth mirror 84 towards a calcium fluoride spectrum-dividing prism 56. An image is formed at a Cassegrain image plane 130 immediately in front of the prism 56. The spectrum-dividing prism 56 is constructed such that radiation in the visible and near IR band (about 0.5 to about 0.9 microns) passes through the prism 56 into the visible/near IR optical path 58 while radiation in the MWIR portion of the spectrum (about 3 to about 5 microns) is reflected upwards through a fold prism 132, made from an infrared transmitting material, into the MWIR optical path 60.

In the visible path, the radiation passes through a relay lens assembly 62 enclosed in a suitable enclosure 134, a focus element 136 adjusting a set of focus lenses 138, and finally to a shutter 88. An image is formed on the focal plane of the image recording medium 64. The shutter 88 opens and closes to control exposure of the visible spectrum image recording medium 64. In the illustrated embodiment, the medium 64 is a charge-coupled device E-O detector, comprising an array of pixels arranged in rows and columns. The array 64 is cooled by a thermo-electric cooler 140. The array and thermoelectric cooler are enclosed in their own housing 142, which includes electronics boards 144 and a set of heat dissipating cooling fans 146.

In the MWIR path, the light passes through a relay lens assembly 66 contained in a suitable housing, through a focus lens assembly 67 and an image is formed at the focal plane of an IR-detecting two dimensional array 68. The MWIR sensor comprises the array 68, a cold stop 69, and an internal filter, all enclosed in a cryogenic dewar 63.

The optical axis of the objective Cassegrain optical subassembly is shown vertical in FIG. 4. This arrangement provides a very compact assembly; if the objective were arranged along a horizontal axis the total length required for the system would have been intolerably large. The use of only reflecting components (catoptric) in the objective allows the collection of light from a very wide spectral region. Such imaging would be impractical or impossible with a refracting objective design.

The point of intersection of the visible relay optical axis and the objective optical axis is an important datum feature of this system. The azimuth mirror 84 reflecting surface is designed to rotate about an axis that contains this intersection point. Furthermore, the entire Cassegrain objective subassembly 54 is arranged to also rotate about this same axis for forward motion compensation. Rotation of the objective permits locking onto ground image detail while the camera and aircraft are moving forward. If the azimuth mirror 84 rotates at half the angular rate of the objective module with respect to the aircraft/camera frame of reference, the selected ground image is effectively locked or frozen onto the detectors. Consequently, the image can be recorded without blur of relative forward motion between the camera and the scene.

Presently preferred embodiments of the subject optical system have focal lengths of between 50 and 100 inches, and an f/number of between 4.0 and 8.0.

Figure 16A:
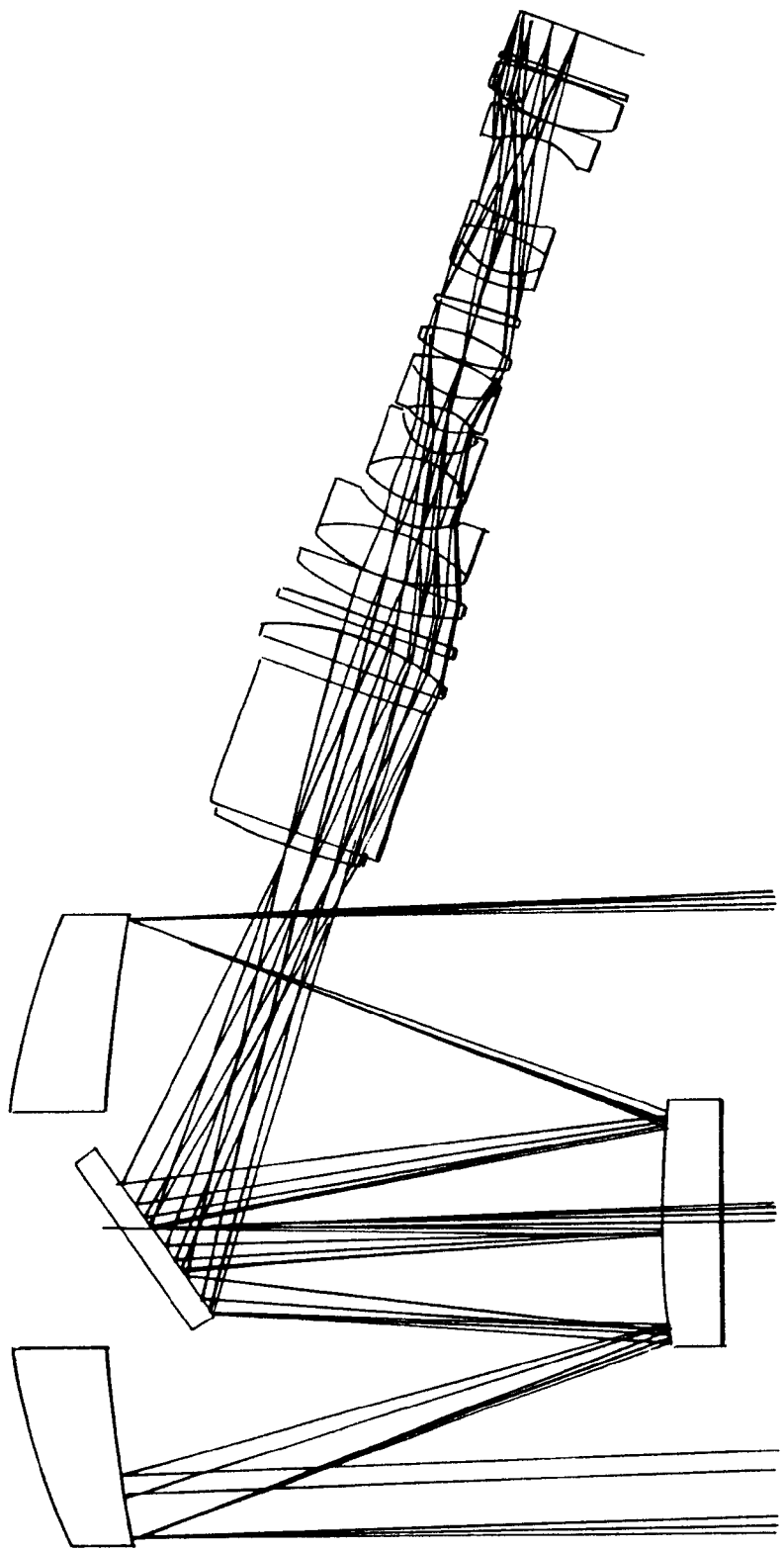
FIG. 16A is a ray diagram of the visible path in the embodiment of FIG. 4.
Figure 16B:
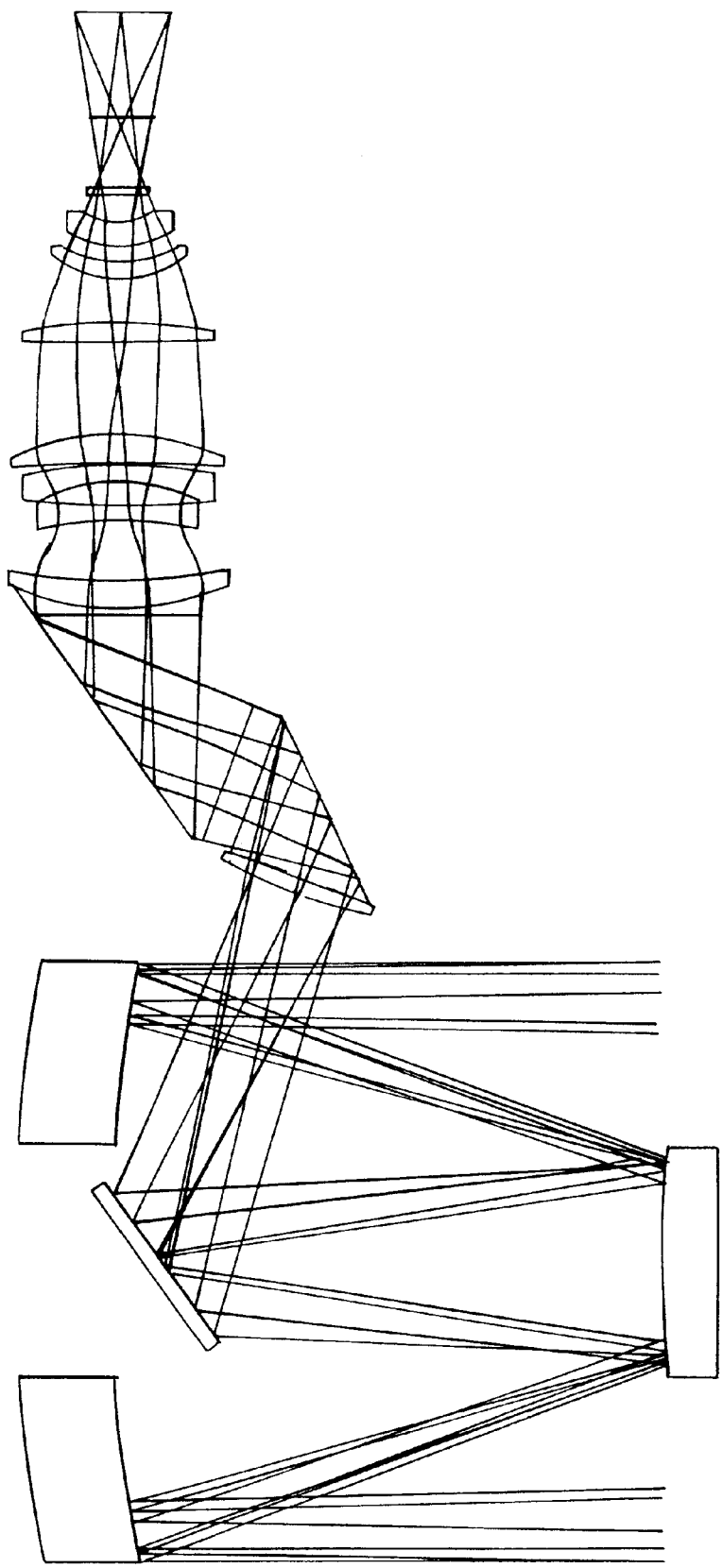
FIG. 16B is a ray diagram of the MWIR path in the embodiment of FIG. 4.
Figure 16C:
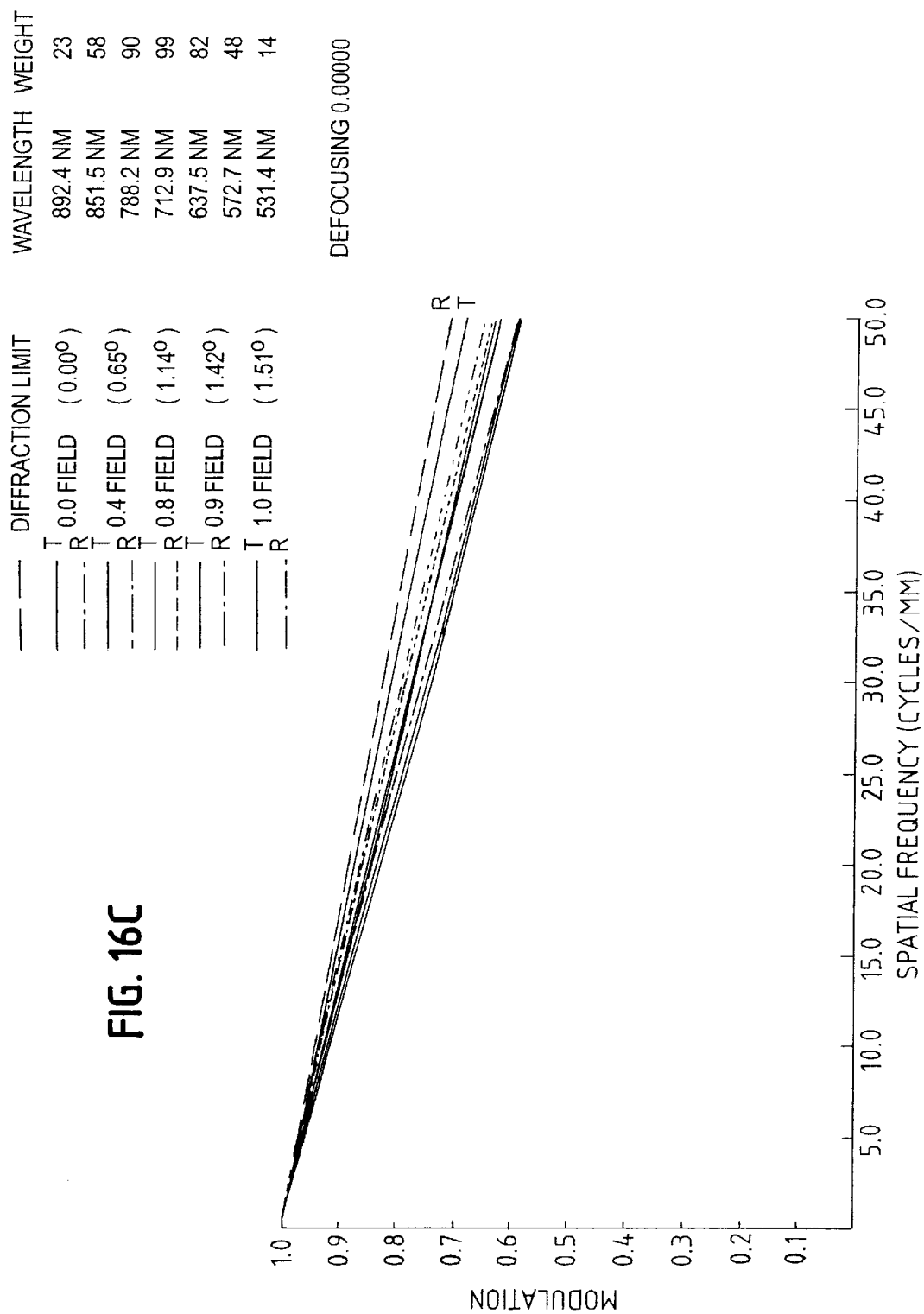
FIG. 16C is a graph of the visible path diffraction modulation transfer function.

FIGS. 16A and 16B are ray diagrams for the visible and MWIR paths of the embodiment of FIG. 4. FIG. 16C is a graph of the diffraction MTF for the visible path. The MTF curves are wavelength-averaged over the visible/IR spectral range of 500 to 900 nm with system spectral weights. The Cassegrain objective subsystem introduces a central obscuration into the light forming beams, and therefore reduces the diffraction-limited performance limits that can be achieved.

In the interest of completeness of the disclosure of the best mode contemplated for practicing the invention, optical prescription, fabrication and aperture data are set forth below in the following tables for the embodiment of FIG. 4. Of course, the data set forth in the tables is by no means limiting of the scope of the invention, and departure thereof is expected in other embodiments of the invention. Furthermore, selection and design of the optical components for any given implementation of the invention is considered to be a matter within the ability of persons skilled in the art of optical design of aerial reconnaissance cameras, with such additional designs being considered obvious modifications of the illustrated embodiment.

In the tables for the visible and MWIR paths, the numbering of the elements in the left-hand column corresponds to the optical elements shown in FIGS. 16A and 16B in progression from the entrance aperture to the detectors.

TABLE 1

VISIBLE PATH PRECRIPTION

FABRICATION DATA
Aug. 30, 2000
Modified 50", F/4 VISIBLE PATH

| ELEMENT NUMBER | RADIUS OF CURVATURE | | THICKNESS | APERTURE DIAMETER | | GLASS |
|---|---|---|---|---|---|---|
| | FRONT | BACK | | FRONT | BACK | |
| OBJECT | INF | | INFINITY*1 | | | |
| | | | | C-1 | | |
| | | | 11.3468 | | | |
| | | | APERTURE STOP | C-2 | | |
| 1 | A(1) | | −11.3468 | C-2 | | REFL |
| 2 | A(2) | | 10.3468 | | 4.8650 | REFL |
| | DECENTER (1) | | | | | |

TABLE 1-continued

| | | | | | | |
|---|---|---|---|---|---|---|
| 3 | INF | | 0.0000 | | C-3 | REFL |
| | | | | | 3.3525 | |
| | | | −8.2000 | | | |
| 4 | −14.5000 CX | INF | −0.3000 | 2.9916 | 3.0328 | CAF2 |
| | | | −0.0200 | | | |
| 5 | INF | INF | −3.1000 | 3.0382 | 3.6125 | CAF2 |
| | | | −0.4000 | | | |
| 6 | INF | 5.6254 CX | −0.6360 | 3.7191 | 3.7662 | 'F9474/30' |
| | | | −0.2000 | | | |
| 7 | INF | INF | −0.2500 | 3.6228 | 3.5785 | 'OG515' |
| | | | −0.3000 | | | |
| 8 | −5.4347 CX | 3.2980 CX | −0.5926 | 3.4210 | 3.3057 | 'A2334/2' |
| | | | −0.0200 | | | |
| 9 | −4.0545 CX | 3.6785 CX | −0.8920 | 3.0291 | 2.7699 | 'B2601/1A' |
| 10 | 3.6785 CC | 1.4940 CC | −0.2500 | 2.7699 | 2.0369 | '12549414' |
| | | | −0.4633 | | | |
| 11 | −2.1854 CX | 1.4016 CX | −0.8744 | 1.9875 | 1.8522 | '135662/A' |
| 12 | 1.4016 CC | 0.8475 CC | −0.2500 | 1.8522 | 1.4085 | 'B2651/2' |
| 13 | −0.8475 CX | 1.5553 CC | −0.4845 | 1.4085 | 1.3037 | 'A2334/2' |
| | | | −0.3747 | | | |
| 14 | 1.2750 CC | −1.5275 CC | −0.3634 | 1.3029 | 1.6318 | 'B2650/1' |
| 15 | −1.5275 CX | 2.1577 CX | −0.6838 | 1.6318 | 1.7456 | '11646656' |
| | | | −0.0270 | | | |
| 16 | −5.0620 CX | −3.3440 CX | −0.4730 | 1.8086 | 1.8207 | 'A2334/2' |
| | | | −0.4251*2 | | | |
| 17 | −7.5223 CX | 19.2220 CX | −0.1985 | 1.6606 | 1.6522 | 'H9420/8' |
| | | | −0.5725*3 | | | |
| 18 | −2.5775 CX | −1.1718 CC | −0.2500 | 1.6800 | 1.5948 | 'D1741/4' |
| 19 | −1.1718 CX | 2.7961 CX | −0.7869 | 1.5948 | 1.5304 | 'B2601/1A' |
| 20 | 2.7961 CC | −2.2230 CC | −0.2500 | 1.5304 | 1.4526 | 'D1741/4' |
| | | | −1.7614 | | | |
| 21 | 1.4142 CC | 21.3497 CX | −0.3802 | 1.7611 | 2.1914 | 'H9418/35' |
| | | | −0.0245 | | | |
| 22 | −3.4440 CX | 12.7030 CX | −0.8500 | 2.4681 | 2.5450 | 'D1741/6' |
| | | | −0.0500 | | | |
| 23 | INF | INF | −0.0800 | 2.5554 | 2.5603 | BK7 Schott |
| | IMAGE DISTANCE = | | −0.9162 | | | |
| IMAGE | INF | | | | 2.6440 | |

NOTES
Positive radius indicates the center of curvature is to the right
Negative radius indicates the center of curvature is to the left
Dimensions are given in inches
Thickness is axial distance to next surface
Image diameter shown above is a paraxial value,
it is not a ray traced value
Other glass suppliers can be used if their materials are
functionally equivalent to the extent needed by the design;
contact the designer for approval of substitutions.

APERTURE DATA

| | | DIAMETER | | DECENTER | | |
|---|---|---|---|---|---|---|
| APERTURE | SHAPE | X | Y | X | Y | ROTATION |
| C-1 | CIRCLE | 13.168 | | | | |
| | CIRCLE (OBSC) | 4.800 | 4.800 | | | |
| C-2 | CIRCLE (OBSC) | 4.800 | 4.800 | | | |
| | CIRCLE | 12.600 | 12.600 | | | |
| C-3 | RECTANGLE | 3.500 | 4.000 | 0.000 | 0.100 | 0.0 |

ASPHERIC CONSTANTS $$Z = \frac{(CURV)Y^2}{1 + (1 - (1 + K)(CURV)Y^2)^{1/2}} + (A)Y^4 + (B)Y^6 + (C)Y^8 + (D)Y^{10}$$

| ASPHERIC | CURV | K | A | B | C | D |
|---|---|---|---|---|---|---|
| A (1) | −0.02881267 | −1.000000 | | | | |
| A (2) | −0.05583473 | −3.928273 | | | | |

DECENTERING CONSTANTS

| DECENTER | X | Y | Z | ALPHA | BETA | GAMMA |
|---|---|---|---|---|---|---|
| D (1) | 0.0000 | 0.0000 | 0.0000 | 35.0000 | 0.0000 | 0.0000 (BEND) |

TABLE 2

MWIR PRESCRIPTION

FABRICATION DATA
Modified 50", F/4 MWIR LENS 2nd Fit to POD Testplates

| ELEMENT NUMBER | RADIUS OF CURVATURE FRONT | RADIUS OF CURVATURE BACK | THICKNESS | APERTURE DIAMETER FRONT | APERTURE DIAMETER BACK | GLASS | |
|---|---|---|---|---|---|---|---|
| OBJECT | INF | | INFINITY*1 | C-1 | | | |
| | | | 11.3468 | | | | |
| 1 | A(1) (Paraboloid) | | 11.3468 | | C-2 | REFL | |
| 2 | A(2) (Ellipsoid) | | 10.3468 | | 4.4000 | REFL | |
| | DECENTER (1) | | | | | | |
| 3 | INF | | −8.2000 | | 3.9482 | REFL | (Azimuth Mirror) |
| 4 | −14.5000 CX | INF | −0.3000 | 3.2080 | 3.2480 | CAF2 | (Field Lens) |
| | | | −0.0200 | | | | |
| 5 | INF | INF | −1.5500 | C-3 | C-4 | CAF2 | ⎫ |
| | DECENTER(2) | | | | | | |
| | INF | | | | C-4 | REFL | ⎬ CaF2 Prism |
| | INF | INF | 1.5500 | C-4 | C-5 | CAF2 | ⎭ |
| | | | 0.6250 | | | | |
| 6 | INF | INF | 2.4000 | C-6 | C-7 | SILICON | ⎫ |
| | DECENTER(3) | | | | | | |
| | INF | | | | C-7 | REFL | ⎬ Silicon Prism |
| | INF | INF | −2.5000 | C-7 | C-8 | SILICON | ⎭ |
| | | | −0.1000 | | | | |
| 7 | −5.2363 CX | −11.8133 CC | −0.6000 | 4.3400 | 4.1700 | SILICON | |
| | | | −1.2602 | | | | |
| 8 | 7.0285 CC | A(3) | −0.3500 | 3.1100 | 3.1800 | GERMMW | |
| | | | −0.4399 | | | | |
| 9 | 3.5768 CC | 10.0404 CX | −0.3500 | 3.2000 | 3.7400 | ZNS | |
| | | | −0.0638 | | | | |
| 10 | 27.0245 CC | 5.1234 CX | −0.6000 | 4.1200 | 4.2400 | SILICON | |
| | | | −1.9286 | | | | |
| 11 | A(4) | 10.1487 CX | −0.4000 | 3.8400 | 3.8200 | ZNS | |
| | | | −0.9223 | | | | |
| 12 | −2.2473 CX | −2.5307 CC | −0.3500 | 2.6700 | 2.4200 | ZNSE | |
| | | | −0.2702*2 | | | | |
| 13 | −2.0677 CX | −1.4306 CC | −0.5000 | 2.1000 | 1.5600 | ZNS | |
| | | | −0.6180*3 | | | | |
| 14 | INF | INF | −0.1180 | 1.1400 | 1.1400 | SILICON | |
| | | | −0.2290 | | | | |
| | APERTURE STOP | | −1.2070 | C-9 | | | (Cold Stop) |
| 15 | INF | INF | −0.0400 | C-10 | C-11 | SILICON | |
| | IMAGE DISTANCE = | | −2.1300 | | | | |
| IMAGE | INF | | | 2.8293 | | | |

NOTES
Positive radius indicates the center of curvature is to the right
Negative radius indicates the center of curvature is to the left
Dimensions are given in inches
Thickness is axial distance to next surface
Image diameter shown above is a paraxial value,
it is not a ray traced value
Other glass suppliers can be used if their materials are
functionally equivalent to the extent needed by the design;
contact the designer for approval of substitutions.

APERTURE DATA

| APERTURE | SHAPE | DIAMETER X | DIAMETER Y | DECENTER X | DECENTER Y | ROTATION |
|---|---|---|---|---|---|---|
| C-1 | CIRCLE | 12.633 | | | | |
| | CIRCLE (OBSC) | 4.800 | 4.800 | | | |
| C-2 | CIRCLE | 12.500 | 12.500 | | | |
| | CIRCLE (OBSC) | 4.800 | 4.800 | | | |
| C-3 | RECTANGLE | 2.900 | 2.900 | (CaF2 Prism - Entrance Face) | | |
| C-4 | RECTANGLE | 2.900 | 4.101 | (CaF2 Prism - Splitter Face) | | |
| C-5 | RECTANGLE | 2.900 | 2.900 | (CaF2 Prism - Exit Face) | | |

TABLE 2-continued

| | | | | | | |
|---|---|---|---|---|---|---|
| C-6 | RECTANGLE | 3.050 | 3.050 | (Silicon Prism - Entrance Face) | | |
| C-7 | RECTANGLE | 3.300 | 5.640 | 0.000 | −0.149 | 0.0 |
| C-8 | RECTANGLE | 3.410 | 3.410 | (Silicon Prism - Exit Face) | | |
| C-9 | CIRCLE | 0.844 | 0.844 | (Cold Stop) | | |
| | CIRCLE (OBSC) | 0.320 | 0.320 | (Occulting Disk) | | |
| C-10 | RECTANGLE | 1.280 | 1.280 | | | |
| C-11 | RECTANGLE | 1.280 | 1.280 | | | |

ASPHERIC CONSTANTS $$Z = \frac{(CURV)Y^2}{1 + (1 - (1 + K)(CURV)Y^2)^{2\ 1/2}} + (A)Y^4 + (B)Y^6 + (C)Y^8 + (D)Y^{10}$$

| ASPHERIC | CURV | K | A | B | C | D |
|---|---|---|---|---|---|---|
| A(1) | −0.02881267 | −1.000000 | | | | |
| A(2) | −0.05583473 | −3.928273 | | | | |
| A(3) | −0.02571678 | 0.000000 | −3.39014E-03 | 3.98460E-04 | −2.25842E-05 | 0.00000E-00 |
| A(4) | −0.02018930 | 0.000000 | 6.40826E-04 | 8.94387E-05 | −1.85905E-05 | 2.93941E-06 |

Electronics System

Figure 17:
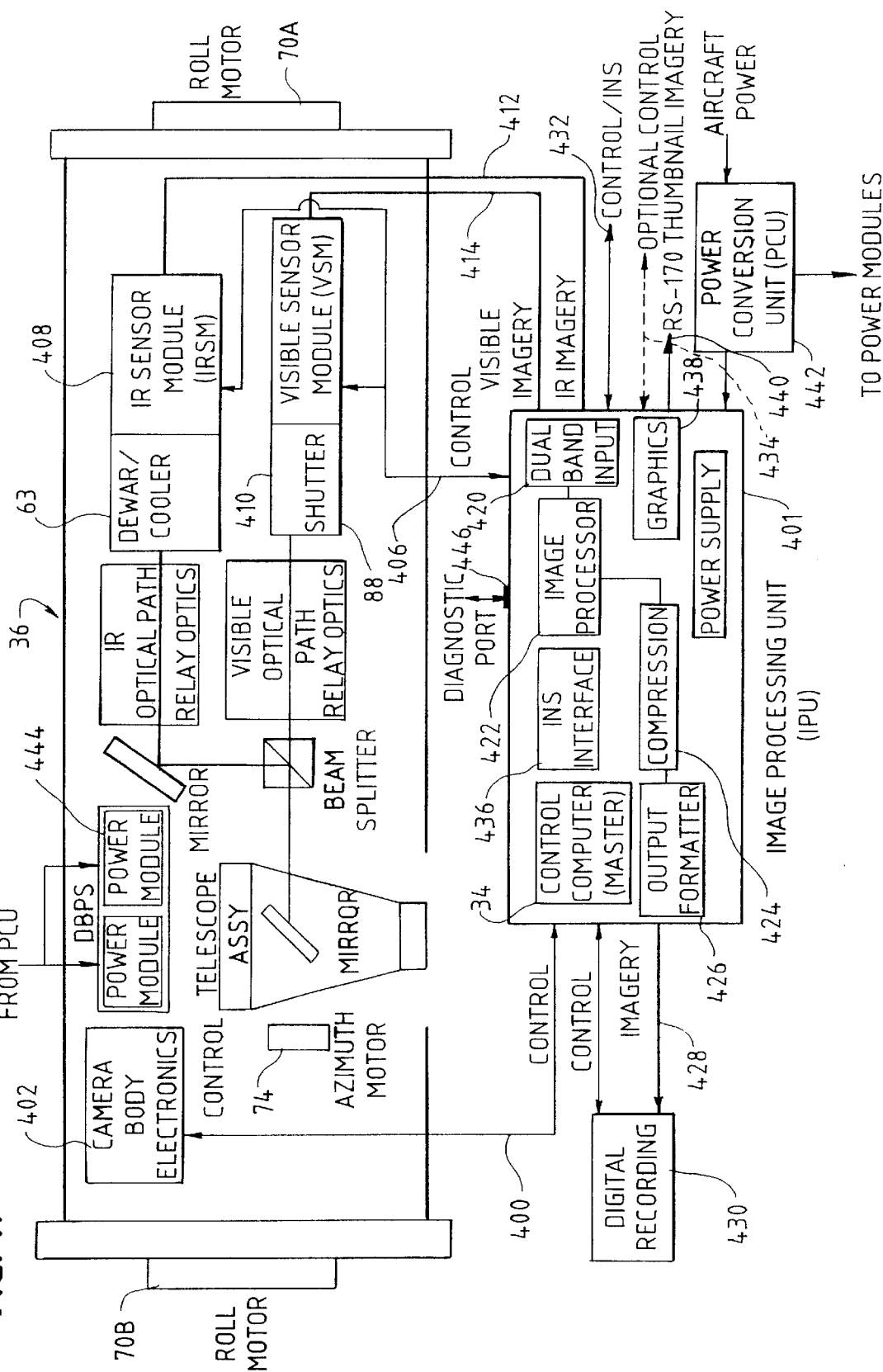
FIG. 17 is a block diagram of the electronics for the camera system of FIGS. 2–5.

The electronics for the camera 36 of FIGS. 1 and 3 is shown in block diagram form in FIG. 17. The electronics includes an image processing unit (IPU) 401 which contains the master control computer 34 of FIG. 1. The master control computer 34 supplies control signals along a conductor 400 to a camera body and stabilization electronics module, represented by block 402. The camera body and stabilization electronics 402 basically includes digital signal processing cards that provide commands to the roll motors 70A and 70B and the Cassegrain or azimuth motor 74 of FIGS. 3, 5 and 6, and receive signals from the stabilization system consisting of the azimuth fiber optic gyroscope 128 mounted on the azimuth mirror and a roll fiber optic gyroscope (not shown) mounted on the camera housing 52. The camera body electronics 402 also receives current roll angle and roll rate data from resolvers in the roll motors 70A and 70B, and from the roll gyroscope, and supplies the roll information to the camera control computer.

The camera control computer 34 also generates control signals, such as start, stop, and counter values, and supplies them via conductor 406 to an IR sensor module (IRSM) 408 and a Visible Sensor Module 410. The IRSM 408 includes a cryogenic dewar or cooler 63, the IR detector 68 (FIG. 4) and associated readout circuitry, and electronic circuitry shown in FIG. 19 and described subsequently for transferring charge through the IR array to achieve roll motion compensation. Pixel information representing IR imagery is read out of the array 68, digitized, and sent along a conductor 412 to the IPU 401. In an alternative embodiment, the electronic circuitry shown in FIG. 19 could be incorporated into the camera body electronics 402 or in the Image Processing Unit 401.

The visible sensor module 410 includes a mechanical shutter 88, a visible spectrum electro-optical detector 64 (FIG. 4) and associate readout registers, and electronic circuitry described in FIG. 19 and described subsequently for transferring charge through the visible spectrum detector 64 to achieve roll motion compensation. Pixel information representing visible spectrum imagery is read out of the detector 64, digitized, and sent along a conductor 414 to the IPU 401.

Visible and IR imagery supplied by the Visible Sensor Module and the IR Sensor Module is received by a dual band input module 420 and supplied to an image processor 422 for purposes of contrast adjustment, filtering, radiometric correction, etc. Typically, images generated by the arrays 64 and 68 are either stored for later retrieval or downlinked to a ground station. In the illustrated embodiment, the imagery is compressed by a data compression module 424, supplied to an output formatter 426 and sent along a conductor 428 to a digital recording module 430 for recording of the imagery on board the aircraft.

Aircraft inertial navigation system data such as aircraft velocity, height, aircraft attitude angles, and possibly other information, is obtained from an aircraft 1553 bus, represented by conductor 432. Operator inputs such as start, stop and roll angle commands from a manual cockpit or camera console or control panel, can also be supplied along the conductor 432 or by an optional control conductor 434. The INS and operator commands are processed in an INS interface circuit 436 and supplied to the camera control computer 34 and used in the algorithms described above. The camera control computer also has a non-volatile memory (not shown) storing fixed parameters or constants that are used in generating the roll motion compensation commands, such as the pixel pitch, array size, master clock rate, and optical system focal length.

The image processor 422 and a graphics module 438 are used to generate thumbnail imagery and supply the imagery to an RS-170 output 440 for viewing in near real time by the operator or pilot on board the reconnaissance vehicle, or for downloading to the ground station. Other format options for the thumbnail imagery are also possible.

Aircraft power is supplied to a power conversion unit 442, which filters, converts and distributes it to two power modules 444. The power modules 444 supply the required AC or DC voltages to the various electronic components in the camera 36.

An RS-232 diagnostic port 446 is provided in the IPU 401 for remote provisioning, diagnostics, and software downloads or upgrades or debugging by a technician. The port 446 provides an interface to the master control computer 34, and the other modules in the IPU 401 and allows the technician to access these units with a general purpose computer. Changes to fixed parameters stored in non-volatile memory, such as a change in the focal length of the camera, are also made via the port 446.

Except as noted herein and elsewhere in this document, the individual modules and components in the electronics are considered to be conventional and therefore can be readily derived be persons skilled in the art. Accordingly, a detailed discussion of the modules per se is omitted from the present discussion.

Roll Motion Compensation

Figure 18:
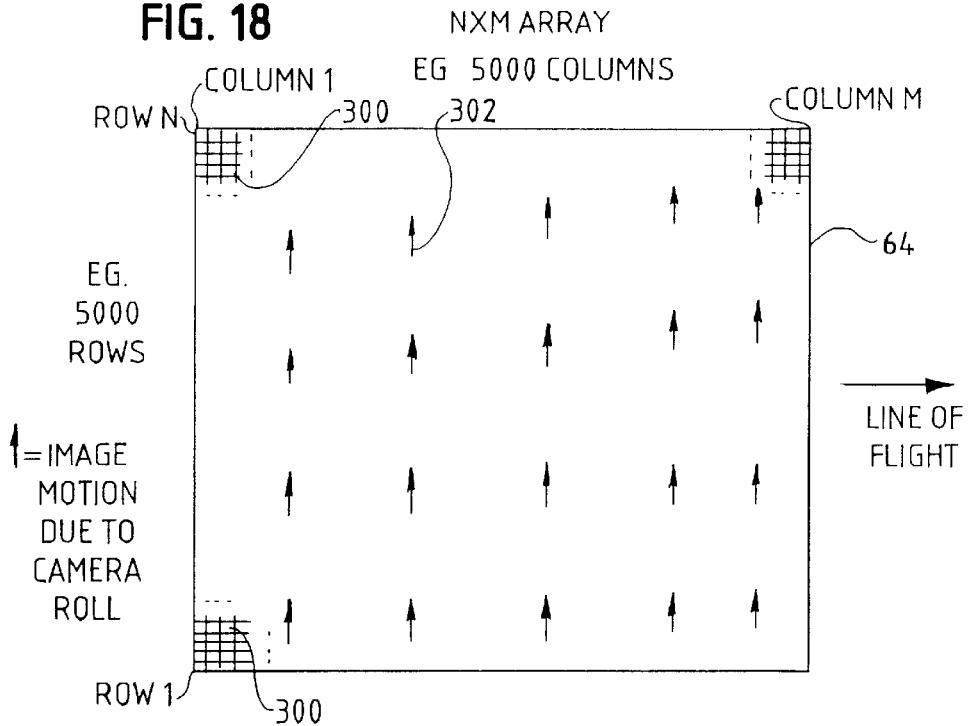
FIG. 18 is schematic representation on an image recording medium in the form of a two dimensional electro-optical array, showing the image motion in the array due to the roll of the camera.

Referring now to FIG. 18, a presently preferred implementation of roll motion compensation in an electro-optical area array detector will now be described. The visible/near IR E-O detector 64 is shown in a plan view. The detector consists of an array of pixel elements 300 arranged in a plurality of rows and columns, with the column direction chosen to be across the line of flight and the row direction in the direction of flight. The array 64 can be any suitable imaging detector including a charge-coupled device, and preferably will comprise at least 5,000 pixels in the row direction and at least 5,000 pixels in the column direction. The illustrated embodiment consists of 5040×5040 pixels, with a 0.010 mm×0.010 mm pixel pitch and a 50.4 mm×50.4 mm array size. The reader is directed to the Lareau et al. U.S. Pat. No. 5,155,597 patent for a suitable detector, however the array need not be organized into column groups as described in the '597 patent and could be configured as a single column group, all columns of pixels clocked at the same rate.

The architecture for the array is not critical, but a full frame imager, as opposed to an interline transfer architecture, is presently preferred. The imager can use either a mechanical shutter or an electronic shutter to expose the array.

The roll motion caused by camera roll motors 70A and 70B produces an image motion indicated by the arrows 302 in the plane of the array 64. The roll motion is in the cross-line of flight direction and the image velocity v is nearly constant throughout the array. The velocity v is equal to the product of the optical system focal length $f$ multiplied by the rate of rotation co. Since $f$ is fixed (and the value stored in memory for the camera control computer), and the rate of rotation is known by virtue of outputs of the fiber-optic gyroscope 128 or from resolvers in the roll motors, the velocity of the image due to roll can be precisely determined for every exposure. The velocity can be expressed in terms of mm/sec, in terms of rows of pixels per second, or in terms of the fraction of a second it takes for a point in the image to move from one row of pixels to the adjacent row, given the known pixel pitch. The pixel information (i.e., stored charge) in the individual pixels 300 is transferred row by row throughout the entire array 64 at the same rate and in the same direction of image motion during the exposure time, thereby avoiding image smear due to the roll motion.

Figure 19:
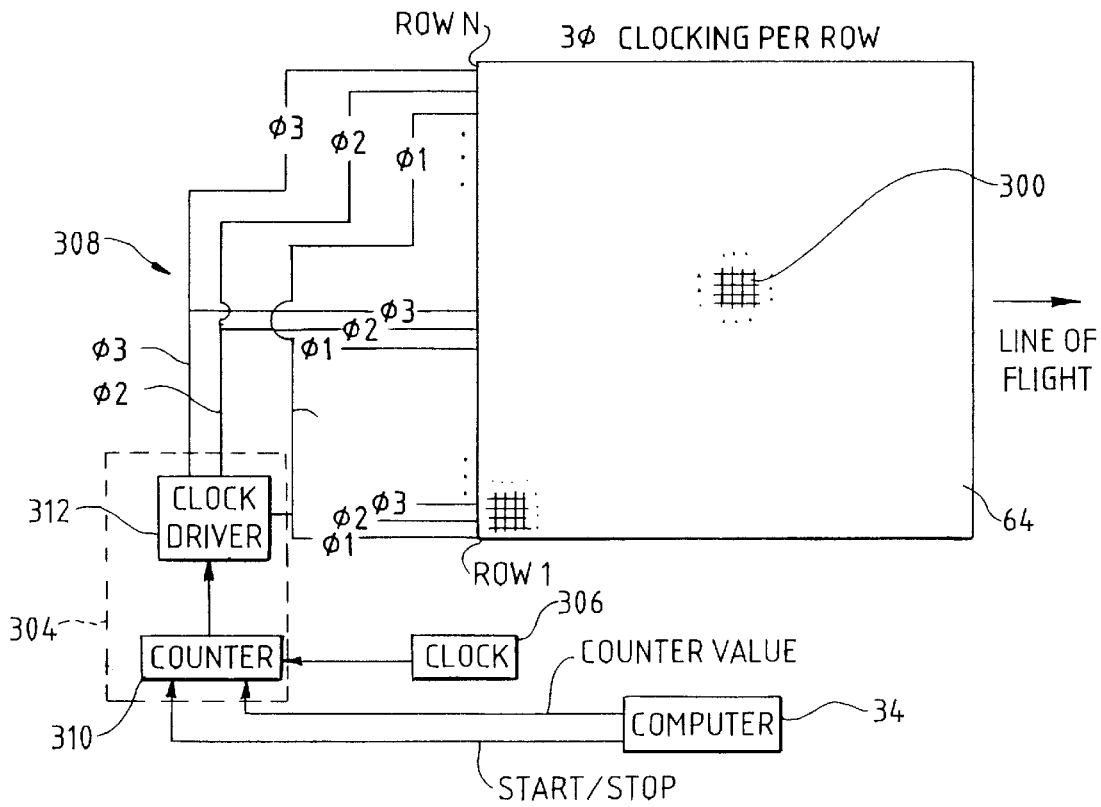
FIG. 19 is another schematic representation of the array of FIG. 18, showing the electronic circuitry that controls the transfer of pixel information in the array at the same velocity as the image in order to provide roll motion compensation.

To accomplish this, and with reference to FIG. 19, the camera electronics includes a counter and clock driver circuit 304 (one for each detector 64, 68) which generates voltage pulses and supplies them to a set of three phase conductors 308 which are coupled to each row of the array. One cycle of three-phase clocking effectuates a transfer of charge from one row to the adjacent row. A master clock 306 generates clock signals at a master clock frequency and supplies them to a counter 310. The camera control computer calculates a counter value which determines the number the counter 310 is supposed to count to at the known master clock rate to time the transfer of charge from one row to another in synchronism with the movement of the image by one row of pixels (0.010 mm). The master computer 34 supplies the counter value to the counter 310, along with a start and stop commands.

At the moment the array 64 is exposed to the scene, the counter 310 starts counting at the clock rate up to the counter value. When the counter value is reached, a trigger signal is sent to a clock driver 312. The clock driver 312 initiates one cycle of three phase clocking on conductors 308, causing the pixel information from row 1 to be transferred to row 2, from row 2 to row 3, etc. When the counter value is reached, the counter 310 resets itself and immediately begins counting again to the counter value, another cycle of clocking is triggered, and the process repeats continuously while the array is exposed and charge is integrated in the detectors. At the end of the exposure period, a stop signal is sent to the counter 310. The pixel information in the array 64 is read out of the array into read-out registers at the bottom of the array (not shown), converted into digital form, and either stored locally on a digital recording medium for later use or transmitted to a remote location such as a base station.

The process described for array 64 is essentially how the IR detector operates as well for accomplishing roll motion compensation. In alternative embodiments, the image motion compensation could be performed in other readout structures depending on the architecture for the array. The IR detector could be sensitive to radiation in the Short Wavelength Infra-Red (SWIR) band (1.0 to 2.5 microns), Mid-Wavelength IR (MWIR) band (3.0 to 5.0 microns) or Long Wavelength IR (LWIR) band (8.0 to 14.0 microns). In such an array, the output of the each photosensitive photodiode detector is coupled to a charge storage device, such as a capacitor or CCD structure, and the charge is shifted from one charge storage device to the adjacent charge storage device in synchronism with the image velocity while charge is being integrated in the charge storage devices.

The process of roll motion compensation can be more finely tuned by deriving the rate of rotation (ω) used in the algorithm from the actual inertial rate sensed by a fiber optic gyroscope mounted to the camera housing or frame. Such a gyroscope can count with a resolution of 1 microradian or better. The gyroscope generates a signal that is supplied to a DSP card in the camera control electronics module 402 (FIG. 17). A signal could also be constructed for imaging array clocking purposes in the form of a pulse train which the imaging array clock generator could phase lock to. By doing this, any rate inaccuracy or stabilization shortcomings associate with the roll motion could be overcome. The roll motion compensation becomes, in effect, a fine stabilization system which removes the residual error from the more coarse electro-mechanical stabilization system. Having a fine system, based on a closed loop feedback from the roll fiber optic gyroscope, would allow for a larger range of roll motion without image degradation.

The above-described roll motion compensation will produce some minor edge effects at the bottom of the array, which are typically ignored since they are a very small fraction of the image generated by the array.

Other Embodiments

As noted above, the principles of roll framing and forward motion compensation described above are applicable to a camera that images in a single band of the electromagnetic spectrum. In such an embodiment, the spectrum dividing prism would not been needed and the objective optical subassembly (Cassegrain or otherwise) would direct the radiation in the band of interest to a single optical path having a photo-sensitive image recording medium placed herein. The spectrum dividing prism and second optical channel are not needed. Otherwise, the operation of the camera in roll framing and spot modes of operation would be the same as described above.

As another alternative embodiment, three or more detectors could image the three or more bands of the electromagnetic spectrum simultaneously. In such an embodiment, an additional spectrum separating prism would be placed in either the visible or IR paths to further subdivide the incident radiation into the desired bands and direct such radiation into additional optical paths, each with its own photosensitive image recording medium. As an example, the visible/near IR band could be divided into a sub 700 nanometer band and a 700 to 1000 nanometer band, each associated with a distinct optical path and associated image forming and focusing lenses and an image recording medium. Meanwhile, the IR portion of the spectrum could be similarly divided into two separate bands, such as SWIR, MWIR, and/or LWIR bands, and each band associated with a distinct optical path and associated image forming and focusing lenses and an image recording medium. Obviously, in such an embodiment the arrangement of optical components in the camera housing will be different from the illustrated embodiment due to the additional spectrum dividing prisms, additional optical paths and optical components, and additional detectors. However, persons skilled in the art will be able to make such a modification from the illustrated embodiment using routine skill.

As yet an another possible embodiment, the camera may be designed for hyperspectral imaging. In such an embodiment, one of the optical paths may be devoted to visible spectrum imaging, while the other path is fitted with a spectroradiometer, an imaging spectrometer, or spectrograph to divide the incident radiation into a large number of sub-bands in the spectrum, such as 50 of such sub-bands. Each sub-band of radiation in the scene is imaged by the hyperspectral imaging array.

As yet another alternative, the camera could be mounted transverse to the roll axis of the aircraft. Such a camera could be used for dual spectrum, full framing imaging in a forward oblique mode, either in a spot mode of operation or in a mode in which overlapping frames of images are generated in a forward oblique orientation.

As yet another alternative embodiment, the smooth roll motion and roll motion compensation feature could be adapted to a step framing camera, such as the KS-127A camera or the step frame camera of the Lareau et al. patent, U.S. Pat. No. 5,668,593. In this embodiment, the roll motors are coupled to the step frame scan head assembly, and continuously rotate the scan head about the roll axis in a smooth, continuous fashion. The detector array and associated relay and focusing optical elements remain stationary with respect to the aircraft. The image acquired by the scan head assembly would need to be derotated with a pechan prism, K mirror or other suitable element, as described in the '593 patent. Roll motion compensation would be performed electronically in the array, as described at length above.

As a variation on the above embodiment, the roll motors are coupled to the step frame scan head and continuously rotate the step frame scan head assembly, while the image derotation is achieved by rotation of the imaging array in synchronism with the rotation of the scan head assembly. Roll motion compensation is achieved by transferring pixel information in the array at substantially the same rate as the rate of image motion due to scan head rotation.

Less preferred embodiments of the invention include other types of optical arrangements. While the catoptric Cassegrain optical system is the preferred embodiment, refractive optical systems, catadioptric optical systems, and still other types of optical arrangements may be used, for example where only single spectrum imaging is performed, where space requirements are not so important, or when other considerations dictate that a different type of optical arrangement for the objective lens is suitable. In such embodiments, the optical subassembly comprising the objective lens would be rotated in the direction of flight to accomplish forward motion compensation as described above, while the entire camera housing including the objective lens is rotated about an axis to thereby generate sweeping coverage of the field of interest, either about the roll axis or about an axis perpendicular to the roll axis.

Presently preferred and alternative embodiments of the invention have been described with particularity. Considerable variation from the disclosed embodiments is possible without departure from the spirit and scope of the invention. For example, the type and structure of the image recording medium is not critical. The details of the optical design, the mechanical system and the electronics may vary from the illustrated, presently preferred embodiments. This true scope and spirit is to be determined by the appended claims, interpreted in light of the foregoing.

We claim:

1. A method for imaging a scene with a framing camera installed in an aerial reconnaissance vehicle, the camera comprising a two dimensional framing array of photosensitive cells, an optical system directing scene radiation onto said array, and a mechanism for rolling said camera about a roll axis, said array of cells storing pixel information and arranged in a plurality of rows and columns, comprising the steps of:

(a) continuously rotating said camera about said roll axis with said roll mechanism to thereby direct scene information onto said two dimensional array;

(b) exposing said array while said camera is rotating and transferring pixel information in said array at a rate substantially equal to an image motion rate due to said rotation of said camera;

(c) reading out said pixel information from said array; and (d) repeating said steps (b), and (c) while said vehicle flies past a scene of interest and while said camera continuously rotates about said roll axis.

2. The method of claim 1, wherein said step of continuously rotating comprises the step of rotating said camera about an axis substantially parallel to the direction of forward motion of said aerial reconnaissance vehicle.

3. The method of claim 1, wherein said step of continuously rotating comprises the step of rotating said camera about an axis in the direction substantially orthogonal to the direction of forward motion of said aerial reconnaissance vehicle.

4. The method of claim 1, wherein said steps (a), (b), (c), and (d) are performed in a a series of cycles as said aircraft flies past a scene of interest.

5. The method of claim 1, wherein said camera generates imagery in a single band of the electromagnetic spectrum.

6. The method of claim 1, wherein said camera includes a second electro-optical detector and wherein said camera generates imagery in two bands of the electromagnetic spectrum simultaneously from said first and second detectors.

7. The method of claim 1, wherein said camera includes an hyperspectral electro-optical detector and optical system.

8. The method of claim 1, wherein said optical system further comprises a derotation prism.

9. The method of claim 1, wherein said optical system further comprises a derotation mirror.

10. The method of claim 1, wherein the camera further comprises a catoptric Cassegrain objective subassembly, wherein said roll mechanism rotates said catoptric Cassegrain objective subassembly, said optical system, and said array about said roll axis.

11. An electro-optical roll framing camera with electronic roll motion compensation, said camera for installation in an aerial reconnaissance vehicle, comprising:
   an electro-optical detector comprising a two-dimensional array of photosensitive cells, said array of cells storing pixel information and arranged in a plurality of rows and columns and having at least one readout register for reading out pixel information from said array;
   an optical system directing scene radiation onto said array,
   a servo-mechanical system coupling said camera to said vehicle adapted for continuously rotating said camera about a rotation axis to thereby direct scene information onto said optical system and said array; and
   rotation motion compensation circuitry electronically transferring pixel information in said array of photosensitive cells at a rate substantially matching the rate of image motion due to said rotation of said camera, whereby the resolution of images generated by said array may be preserved.

12. The camera of claim 11, wherein said camera is installed in said vehicle such that said servo-mechanical system continuously rotates said camera about an axis substantially parallel to the direction of forward motion of said vehicle.

13. The camera of claim 11, wherein said camera is installed in said vehicle such that said servo-mechanical system continuously rotates said camera about an axis substantially orthogonal to the direction of forward motion of said vehicle.

14. The camera of claim 11, wherein said array generates imagery in a single band of the electro-magnetic spectrum.

15. The camera of claim 11, wherein said camera includes a second electro-optical detector and wherein said camera generates imagery in two bands of the electromagnetic spectrum simultaneously from said first and second detectors.

16. The camera of claim 11, wherein said camera includes a hyperspectral electro-optical detector and optical system.

17. The camera of claim 11, wherein said optical system further comprises a derotation prism.

18. The camera of claim 11, wherein said optical system further comprises a derotation mirror.

19. The method of claim 11, wherein the camera further comprise a catoptric Cassegrain objective lens, wherein said servo-mechanical system rotates said catoptric Cassegrain objective lens, said optical system, and said array about said rotation axis.

20. A method of generating a frame of imagery of a scene of interest by an aerial reconnaissance camera installed in a moving airborne vehicle, said camera comprising an optical system and at least one framing image recording medium, said optical system and framing image recording medium incorporated into a camera housing mounted to the vehicle, comprising the steps of:
   (1) continuously rotating the camera housing, including said optical system and said framing image recording medium, about a roll axis parallel to the roll axis of said vehicle;
   (2) simultaneously and independently rotating said optical system in an direction orthogonal to said roll axis and in a direction of flight of said vehicle to thereby compensate for forward motion of said vehicle;
   (3) while said camera is rotating about said roll axis and said optical system is rotating in said direction of flight, exposing said image recording medium to radiation from said scene to thereby generate said frame of imagery; and
   (4) compensating for the roll motion of said camera housing to thereby prevent blurring of an image generated by said framing image recording medium due to said roll motion.

21. The method of claim 20, wherein said framing image recording medium is exposed to said scene in a series of exposures as said camera continuously rotates about said roll axis.

22. The method of claim 20, wherein said series of exposures overlap in the cross-line of flight direction.

23. The method of claim 20, wherein said camera incorporates a spectrum dividing element and a second framing image recording medium, and wherein said camera operates to generate two frames of imagery of said scene in two different portions of the electromagnetic spectrum simultaneously.

24. The method of claim 20, wherein said optical system forms an image at an image plane, and wherein said optical system comprises a Cassegrain optical system having a primary mirror, a secondary mirror rigidly coupled to said primary mirror, and a flat azimuth mirror located in the optical path between the secondary mirror and the Cassegrain image plane.

25. The method of claim 24, wherein to compensate for forward motion of said vehicle said said primary and secondary mirrors are rotated in the flight direction at a rate equal to V/R (in units of radians per second) where V is the velocity of aerial reconnaissance vehicle and R is either the range to the scene of interest or an approximation of said range, and wherein said azimuth mirror rotates at a rate equal to ½ (V/R) in the same direction as the rotation of said primary and secondary mirrors.

26. The method of claim 20, wherein said image recording medium comprises a two dimensional area framing array electro-optical detector.

27. The method of claim 23, wherein both of said framing image recording media comprise two dimensional array electro-optical detectors, one of said electro-optical detectors sensitive to radiation in the visible portion of the electromagnetic spectrum and wherein the other of said electro-optical detectors is sensitive to radiation in the infrared portion of the electromagnetic spectrum.

28. The method of claim 27, wherein the detector sensitive to radiation in the infrared portion of the electromagnetic spectrum is sensitive to radiation having a wavelength of between 1.0 and 2.5 microns, 3.0 and 5.0 microns, or 8.0 and 14.0 microns.

29. The method of claim 27, wherein said electro-optical detectors comprise an array of pixel elements arranged in a plurality of rows and columns, compensation for roll motion of said camera housing is performed by electronic circuitry transferring pixel information in said electro- optical detectors from row to adjacent row at a pixel information transfer rate substantially equal to the rate of image motion in the plane of said electro-optical detectors due to roll of said camera housing.

30. The method as claimed in claim 20, wherein said image recording medium comprises photo-sensitive film.

31. The method of claim 30, wherein compensation for roll motion of said camera housing is performed by moving the film at a rate substantially equal to the rate of image motion in the plane of said film due to roll of said camera housing.

32. The method of claim 20, wherein said camera further comprises:
   a spectrum dividing element receiving radiation from said optical system, said element directing radiation in a first band of the electromagnetic spectrum into a first optical path and directing radiation in a second band of the electromagnetic spectrum into a second optical path different from said first optical path;
   a first two-dimensional image recording medium in said first optical path for generating frames of imagery in said first band of the electromagnetic spectrum; and
   a second two-dimensional image recording medium in said second optical path for generating frames of imagery in said second band of the electromagnetic spectrum;
   a first motor system coupled to said camera housing rotating said camera housing about a first axis, said camera housing installed in said aerial reconnaissance vehicle such that said first axis of rotation is parallel to the roll axis of said aerial reconnaissance vehicle,
   wherein said image recording media are exposed to said scene to generate frames of imagery as said first motor system rotates said camera housing in a continuous fashion about said first axis, said first and second image recording media having a means for compensating for image motion due to said rotation of said camera housing; and
   a second motor system coupled to said optical system, said second motor system rotating said optical system about a second axis in the direction of forward motion of said vehicle to compensate for forward motion of said aerial reconnaissance vehicle.

33. A method for dual band framing reconnaissance in which frames of imagery of a scene of interest are taken by an aerial reconnaissance camera installed in a moving airborne vehicle, said camera comprising a Cassegrain optical system, a first framing image recording medium and a second framing image recording medium, said Cassegrain optical system and said first and second framing image recording media incorporated into a camera housing mounted to the vehicle, the method comprising the steps of:
   1) continuously rotating the camera housing, including said optical system and said first and second framing image recording media, from a first position to a second position about a roll axis parallel to the roll axis of said vehicle;
   2) dividing radiation from a scene of interest into two different optical paths including a first optical path and a second optical path, said first framing image recording medium placed in said first optical path and said second framing image recording medium placed in said second optical path;
   3) simultaneously and independently rotating said Cassegrain optical system in an direction orthogonal to said roll axis and in a direction of flight of said vehicle to thereby compensate for forward motion of said vehicle;
   4) while said camera is rotating about said roll axis and said Cassegrain optical system is rotating in said direction of flight, exposing said image recording media to radiation from said scene in a series of exposures to thereby generate said frames of imagery; and
   5) compensating for the roll motion of said camera housing to thereby prevent smearing of an image generated by said first and second framing image recording media due to said roll motion.

34. The method of claim 33, further comprising the step of returning said camera housing to said first roll position after it has rotated from said first roll position to said second roll position, and thereafter repeating steps 1, 2, 3, 4 and 5.

35. The method of claim 33, wherein during said rotation of said camera housing from said first roll position to said second roll position, said first and second image recording media are exposed N times, where N is an integer number of frames between 2 and 20.

36. The method of claim 33, wherein the angular difference between said first roll position and said second roll position is less than 10 degrees.

37. The method of claim 33, wherein said camera is rotated through nadir.

38. The method of claim 33, wherein said series of exposures overlap in the cross-line of flight direction.

39. The method of claim 33, wherein said Cassegrain optical system forms an image at a Cassegrain image plane, and wherein said Cassegrain optical system comprises a primary mirror, a secondary mirror rigidly coupled to said primary mirror, and a flat azimuth mirror located in the optical path between the secondary mirror and the Cassegrain image plane.

40. The method of claim 39, wherein to compensate for forward motion of said vehicle said primary and secondary mirrors are rotated in the flight direction at a rate equal to V/R (in units of radians per second) where V is the velocity of aerial reconnaissance vehicle and R is either the range to the scene of interest or an approximation of said range, and wherein said azimuth mirror rotates at rate equal to ½ (V/R) in the same direction as the rotation of said primary and secondary mirrors.

41. The method of claim 33, wherein said first and second framing image recording media comprise two-dimensional array electro-optical detectors, one of said electro-optical detectors sensitive to radiation in the visible portion of the electromagnetic spectrum and wherein the other of said electro-optical detectors is sensitive to radiation in the infrared portion of the electromagnetic spectrum.

42. The method of claim 41, wherein the detector sensitive to radiation in the infrared portion of the electromagnetic spectrum is sensitive to radiation having a wavelength of between 1.0 and 2.5 microns, 3.0 and 5.0 microns, or 8.0 and 14.0 microns.

43. The method of claim 41, wherein said electro-optical detectors comprise an array of pixel elements arranged in a plurality of rows and columns, and wherein compensation for roll motion of said camera housing is performed by electronic circuitry transferring pixel information in said electro-optical detectors from row to adjacent row at a pixel information transfer rate substantially equal to the rate of image motion in the plane of said electro-optical detectors due to roll of said camera housing.

44. A method for imaging a scene with a framing camera installed in an aerial reconnaissance vehicle, the camera comprising a two dimensional array of photosensitive cells, said array of cells storing pixel information and arranged in a plurality of rows and columns, a scan head directing scene radiation onto said array, and a mechanism for rotating said scan head about a rotation axis in a continuous manner, comprising the steps of:
   (a) continuously rotating said scan head about said rotation axis with said roll mechanism to thereby direct an image containing scene information towards said two dimensional array;

(b) derotating said image containing scene information;

(c) while said scan head is continuously rotating, transferring pixel information in said array at a rate substantially equal to an image motion rate;

(d) reading out said pixel information from said array; and (e) repeating said steps (b), (c) and (d) while said vehicle flies past a scene of interest and while said scan head continuously rotates about said rotation axis.

45. The method of claim 44, wherein said step of continuously rotating comprises the step of rotating said scan head about an axis substantially parallel to the direction of forward motion of said aerial reconnaissance vehicle.

46. The method of claim 44, wherein said step of continuously rotating comprises the step of rotating said scan head about an axis in the direction substantially orthogonal to the direction of forward motion of said aerial reconnaissance vehicle.

47. The method of claim 44, wherein said steps (a), (b), (c), and (d) and (e) are performed in a series of cycles as said aircraft flies past a scene of interest.

48. A method for imaging a scene with a framing camera installed in an aerial reconnaissance vehicle, the camera comprising a two dimensional array of photosensitive cells, said array of cells storing pixel information and arranged in a plurality of rows and columns, a scan head directing scene radiation onto said array, and a mechanism for rotating said scan head about a rotation axis in a continuous manner, comprising the steps of:

(a) continuously rotating said scan head about said rotation axis with said roll mechanism to thereby direct an image containing scene information towards said two dimensional array;

(b) rotating said two dimensional array in synchronism with said rotation of said scan head to thereby derotate said image containing scene information;

(c) while said scan head and said two dimensional array are continuously rotating, transferring pixel information in said array at a rate substantially equal to an image motion rate due to said rotation of said scan head;

(d) reading out said pixel information from said array; and (e) repeating said steps (b), (c) and (d) while said vehicle flies past a scene of interest and while said scan head continuously rotates about said rotation axis.

49. The method of claim 48, wherein said step of continuously rotating comprises the step of rotating said scan head about an axis substantially parallel to the direction of forward motion of said aerial reconnaissance vehicle.

50. The method of claim 48, wherein said step of continuously rotating comprises the step of rotating said scan head about an axis in the direction substantially orthogonal to the direction of forward motion of said aerial reconnaissance vehicle.

51. The method of claim 48, wherein said steps (a), (b), (c), and (d) and (e) are performed in a series of cycles as said aircraft flies past a scene of interest.

* * * * *